US012082156B2

(12) United States Patent
Zhang et al.

(10) Patent No.: US 12,082,156 B2
(45) Date of Patent: Sep. 3, 2024

(54) INTER-BASE STATION BEAM MANAGEMENT PROCEDURE

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Huilin Xu, Temecula, CA (US); Junyi Li, Fairless Hills, PA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 189 days.

(21) Appl. No.: 17/529,040

(22) Filed: Nov. 17, 2021

(65) Prior Publication Data

US 2023/0156662 A1  May 18, 2023

(51) Int. Cl.
*H04B 17/318* (2015.01)
*H04W 56/00* (2009.01)
(Continued)

(52) U.S. Cl.
CPC .......... *H04W 72/02* (2013.01); *H04B 17/318* (2015.01); *H04W 56/001* (2013.01); *H04W 72/046* (2013.01); *H04W 72/541* (2023.01)

(58) Field of Classification Search
CPC .... H04B 7/0695; H04B 7/088; H04B 17/345; H04L 5/0007; H04L 5/0048; H04L 5/14; H04W 24/08; H04W 24/10
(Continued)

(56) References Cited

U.S. PATENT DOCUMENTS

| 2019/0342057 A1 | 11/2019 | Rico Alvarino et al. |
| 2022/0150012 A1* | 5/2022 | Su .......................... H04L 5/0007 |
| 2022/0182847 A1* | 6/2022 | Sha ........................ H04W 24/10 |

FOREIGN PATENT DOCUMENTS

| WO | WO-2018126792 A1 | 7/2018 |
| WO | WO-2020166946 A1 | 8/2020 |

OTHER PUBLICATIONS

Partial International Search Report—PCT/US2022/077171—ISA/EPO—Jan. 5, 2023.
(Continued)

*Primary Examiner* — Harun Chowdhury
(74) *Attorney, Agent, or Firm* — Holland & Hart LLP

(57) ABSTRACT

Methods, systems, and devices for wireless communications are described. Aspects of the present disclosure provide techniques to achieve inter-base station beam management to avoid interference during full-duplex (FD) operations, half-duplex (HD) operations, flexible time-domain duplexing (TDD), or a combination thereof, by performing interference management specific to beam configurations. For example, a first base station (e.g., an aggressor base station operating in FD) may perform one or more actions to proactively determine if inter-base station interference may occur. In some cases, the aggressor base station may request measurements from one or more victim base stations. In other examples, the victim base station may request measurements from the aggressor base station. Additionally or alternatively, the victim base station may provide reactive feedback to the aggressor base station upon detecting interference.

26 Claims, 13 Drawing Sheets

(51) Int. Cl.
   *H04W 72/02* (2009.01)
   *H04W 72/044* (2023.01)
   *H04W 72/541* (2023.01)
(58) Field of Classification Search
   USPC .................................... 370/252, 329, 331
   See application file for complete search history.

(56) References Cited

OTHER PUBLICATIONS

International Search Report and Written Opinion—PCT/US2022/077171—ISA/EPO—Mar. 2, 2023.

\* cited by examiner

INTER-BASE STATION BEAM MANAGEMENT PROCEDURE

FIELD OF TECHNOLOGY

The present disclosure relates to wireless communications, including inter-base station beam management procedure.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may operate in a full-duplex (FD) mode or a half-duplex (HD) mode where neighboring base stations may each transmit uplink messages, downlink messages, or both concurrently. For example, in a FD mode, a base station may transmit downlink information to a user equipment (UE) concurrently with receiving uplink information from the UE. In such cases, the base station may utilize one antenna panel to perform uplink communications while utilizing a second antenna panel to perform downlink communications. In some cases, however, there may be multiple base stations performing FD operations within a geographic region. In such cases, a first base station performing FD operations may interfere with a second, neighboring base station performing FD operations. For example, the first base station (e.g., aggressor base station) may perform FD operations while transmitting downlink information to a UE, which may be inadvertently received at the second base station (e.g., victim base station) also performing FD operations. In another example, a first base station performing HD operations may transmit on a downlink while a second, neighboring base station receives on an uplink. As such, the second base station may experience interference while performing FD or HD operations due to the first base station.

SUMMARY

The described techniques relate to improved methods, systems, devices, and apparatuses that support inter-base station beam management procedure. Generally, the described techniques provide for techniques to achieve inter-base station beam management to avoid interference during full-duplex (FD) operations, half-duplex (HD) operations, or both, by performing interference management specific to beam configurations. Signaling may be between base stations (e.g., between gNodeBs (gNBs), between nodes of an integrated access and backhaul network, or both). For example, a first base station (e.g., an aggressor base station operating in FD) may determine that one or more transmissions (e.g., downlink transmissions) originating at the first base station is interfering with transmissions (e.g., uplink transmissions) at a second base station (e.g., victim base station operating in FD). Based on the determination, the aggressor base station, the victim base station, or both, may perform one or more operations to mitigate interference. In some cases, the aggressor base station may request measurements from one or more victim base stations. In other examples, the victim base station may request measurements from the aggressor base station. Additionally or alternatively, the victim base station may provide reactive feedback to the aggressor base station upon detecting interference. Implementing interference management for beam configurations, interference experienced between base stations operating in FD, HD, or both, may be reduced, which may improve overall network efficiency and reduce latency.

A method for wireless communication at a first base station is described. The method may include transmitting signals according to each beam configuration of a set of beam configurations for an interference management procedure, receiving, from a second base station, a report that indicates a set of measurement results and identifies one or more beam configurations of the set of beam configurations corresponding to the set of measurement results, and transmitting to one or more user equipments (UEs) served by the first base station according to a beam configuration selected by the first base station based on the report.

An apparatus for wireless communication at a first base station is described. The apparatus may include a processor, memory coupled with the processor, and instructions stored in the memory. The instructions may be executable by the processor to cause the apparatus to transmit signals according to each beam configuration of a set of beam configurations for an interference management procedure, receive, from a second base station, a report that indicates a set of measurement results and identifies one or more beam configurations of the set of beam configurations corresponding to the set of measurement results, and transmit to one or more UEs served by the first base station according to a beam configuration selected by the first base station based on the report.

Another apparatus for wireless communication at a first base station is described. The apparatus may include means for transmitting signals according to each beam configuration of a set of beam configurations for an interference management procedure, means for receiving, from a second base station, a report that indicates a set of measurement results and identifies one or more beam configurations of the set of beam configurations corresponding to the set of measurement results, and means for transmitting to one or more UEs served by the first base station according to a beam configuration selected by the first base station based on the report.

A non-transitory computer-readable medium storing code for wireless communication at a first base station is described. The code may include instructions executable by a processor to transmit signals according to each beam configuration of a set of beam configurations for an interference management procedure, receive, from a second base station, a report that indicates a set of measurement results and identifies one or more beam configurations of the set of beam configurations corresponding to the set of measurement results, and transmit to one or more UEs served by the first base station according to a beam configuration selected by the first base station based on the report.

Some examples of the method, apparatuses, and non-transitory computer-readable medium described herein may further include operations, features, means, or instructions for transmitting, to the second base station, a request for the second base station to measure the signals transmitted by the first base station according to the set of beam configurations, the report received at least in part in response to the transmitted request.

In some examples of the method, apparatuses, and non-transitory computer-readable medium described herein, transmitting the signals according to each beam configuration of the set of beam configurations may include operations, features, means, or instructions for transmitting one or more synchronization signal blocks or channel state information reference signals using each beam configuration of the set of beam configurations, where the one or more beam configurations identified by the report correspond to one or more of the one or more synchronization signal blocks or channel state information reference signals.

In some examples of the method, apparatuses, and non-transitory computer-readable medium described herein, receiving the report may include operations, features, means, or instructions for receiving, from the second base station, an indication of a cross base station interference signal strength associated with interference between base stations and associated with at least one beam pair that includes at least one beam configuration of the set of beam configurations and a receive beam of the second base station, a highest signal strength from a set of cross base station interference signal strengths associated with the set of beam configurations and a set of receive beams of the second base station, one or more beam configurations that may be allowed by the second base station, one or more beam configurations that may be disallowed by the second base station, or any combination thereof.

Some examples of the method, apparatuses, and non-transitory computer-readable medium described herein may further include operations, features, means, or instructions for communicating a measurement configuration that identifies the set of beam configurations and one or more parameters for the set of beam configurations.

In some examples of the method, apparatuses, and non-transitory computer-readable medium described herein, the one or more parameters for the set of beam configurations include quasi-co-location information, a repetition quantity, a periodicity, a time location, a frequency location, a cross base station interference threshold, or a combination thereof, for a measurement procedure to be performed.

In some examples of the method, apparatuses, and non-transitory computer-readable medium described herein, communicating the measurement configuration may include operations, features, means, or instructions for receiving the measurement configuration from the second base station.

In some examples of the method, apparatuses, and non-transitory computer-readable medium described herein, communicating the measurement configuration may include operations, features, means, or instructions for receiving the measurement configuration from a central unit associated with the first base station, the second base station, or both.

A method for wireless communication at a second base station is described. The method may include receiving signals transmitted by a first base station according to each beam configuration of a set of beam configurations for an interference management procedure and transmitting, in response to the request, a report that indicates a set of measurement results and identifies one or more beam configurations of the set of beam configurations corresponding to the set of measurement results.

An apparatus for wireless communication at a second base station is described. The apparatus may include a processor, memory coupled with the processor, and instructions stored in the memory. The instructions may be executable by the processor to cause the apparatus to receive signals transmitted by a first base station according to each beam configuration of a set of beam configurations for an interference management procedure and transmit, in response to the received signals, a report that indicates a set of measurement results and identifies one or more beam configurations of the set of beam configurations corresponding to the set of measurement results.

Another apparatus for wireless communication at a second base station is described. The apparatus may include means for receiving signals transmitted by a first base station according to each beam configuration of a set of beam configurations for an interference management procedure and means for transmitting, in response to the received signals, a report that indicates a set of measurement results and identifies one or more beam configurations of the set of beam configurations corresponding to the set of measurement results.

A non-transitory computer-readable medium storing code for wireless communication at a second base station is described. The code may include instructions executable by a processor to receive signals transmitted by a first base station according to each beam configuration of a set of beam configurations for an interference management procedure and transmit, in response to the received signals, a report that indicates a set of measurement results and identifies one or more beam configurations of the set of beam configurations corresponding to the set of measurement results.

Some examples of the method, apparatuses, and non-transitory computer-readable medium described herein may further include operations, features, means, or instructions for receiving, from the first base station, a request for the second base station to measure signals transmitted by the first base station according to the set of beam configurations.

In some examples of the method, apparatuses, and non-transitory computer-readable medium described herein, receiving the signals according to each beam configuration of the set of beam configurations may include operations, features, means, or instructions for receiving one or more synchronization signal blocks or channel state information reference signals using each beam configuration of the set of beam configurations, where the one or more beam configurations identified by the report correspond to one or more of the one or more synchronization signal blocks or channel state information reference signals.

In some examples of the method, apparatuses, and non-transitory computer-readable medium described herein, transmitting the report may include operations, features, means, or instructions for transmitting an indication of a cross base station interference signal strength associated with at least one beam pair that includes at least one beam configuration of the set of beam configurations and a receive beam of the second base station, a highest signal strength from a set of cross base station interference signal strengths associated with the set of beam configurations and a set of receive beams of the second base station, one or more beam configurations that may be allowed by the second base station, one or more beam configurations that may be disallowed by the second base station, or any combination thereof.

Some examples of the method, apparatuses, and non-transitory computer-readable medium described herein may further include operations, features, means, or instructions for communicating a measurement configuration that identifies the set of beam configurations and one or more parameters for the set of beam configurations.

In some examples of the method, apparatuses, and non-transitory computer-readable medium described herein, the one or more parameters for the set of beam configurations include quasi-co-location information, a repetition quantity, a periodicity, a time location, a frequency location, a cross base station interference threshold, or a combination thereof, for a measurement procedure to be performed.

In some examples of the method, apparatuses, and non-transitory computer-readable medium described herein, communicating the measurement configuration may include operations, features, means, or instructions for transmitting the measurement configuration to the first base station.

In some examples of the method, apparatuses, and non-transitory computer-readable medium described herein, communicating the measurement configuration may include operations, features, means, or instructions for receiving the measurement configuration from a central unit associated with the first base station, the second base station, or both.

A method for wireless communication at a first base station is described. The method may include receiving signals from a second base station according to each beam configuration of a set of beam configurations for an interference management procedure, selecting a beam configuration to use to transmit to one or more UEs served by the first base station based on a measurement procedure performed on the signals received from the second base station, and transmitting to the one or more user equipment (UE)s according to the selected beam configuration.

An apparatus for wireless communication at a first base station is described. The apparatus may include a processor, memory coupled with the processor, and instructions stored in the memory. The instructions may be executable by the processor to cause the apparatus to receive signals from a second base station according to each beam configuration of a set of beam configurations for an interference management procedure, select a beam configuration to use to transmit to one or more UEs served by the first base station based on a measurement procedure performed on the signals received from the second base station, and transmit to the one or more UEs according to the selected beam configuration.

Another apparatus for wireless communication at a first base station is described. The apparatus may include means for receiving signals from a second base station according to each beam configuration of a set of beam configurations for an interference management procedure, means for selecting a beam configuration to use to transmit to one or more UEs served by the first base station based on a measurement procedure performed on the signals received from the second base station, and means for transmitting to the one or more UEs according to the selected beam configuration.

A non-transitory computer-readable medium storing code for wireless communication at a first base station is described. The code may include instructions executable by a processor to receive signals from a second base station according to each beam configuration of a set of beam configurations for an interference management procedure, select a beam configuration to use to transmit to one or more UEs served by the first base station based on a measurement procedure performed on the signals received from the second base station, and transmit to the one or more UEs according to the selected beam configuration.

Some examples of the method, apparatuses, and non-transitory computer-readable medium described herein may further include operations, features, means, or instructions for transmitting, to the second base station, a request for the second base station to transmit the signals according to the set of beam configurations for the interference management procedure.

In some examples of the method, apparatuses, and non-transitory computer-readable medium described herein, receiving the signals from the second base station according to the set of beam configurations may include operations, features, means, or instructions for receiving one or more synchronization signal blocks or channel state information reference signals corresponding to the set of beam configurations.

In some examples of the method, apparatuses, and non-transitory computer-readable medium described herein, transmitting the request for the second base station may include operations, features, means, or instructions for transmitting, to the second base station, the request including an indication of one or more parameters for the second base station to use to transmit the signals according to the set of beam configurations.

Some examples of the method, apparatuses, and non-transitory computer-readable medium described herein may further include operations, features, means, or instructions for receiving a measurement configuration that identifies the set of beam configurations and one or more parameters for the set of beam configurations.

In some examples of the method, apparatuses, and non-transitory computer-readable medium described herein, the one or more parameters for the set of beam configurations include quasi-co-location information, a repetition quantity, a periodicity, a time location, a frequency location, a cross base station interference threshold, or a combination thereof, for the measurement procedure to be performed.

In some examples of the method, apparatuses, and non-transitory computer-readable medium described herein, receiving the measurement configuration may include operations, features, means, or instructions for receiving the measurement configuration from the second base station.

In some examples of the method, apparatuses, and non-transitory computer-readable medium described herein, receiving the measurement configuration may include operations, features, means, or instructions for receiving the measurement configuration from a central unit associated with the first base station, the second base station, or both.

A method for wireless communication at a second base station is described. The method may include receiving messages from one or more UEs served by the second base station according to a set of beam configurations and transmitting signals to a first base station according to each beam configuration of the set of beam configurations for an interference management procedure.

An apparatus for wireless communication at a second base station is described. The apparatus may include a processor, memory coupled with the processor, and instructions stored in the memory. The instructions may be executable by the processor to cause the apparatus to receive messages from one or more UEs served by the second base station according to a set of beam configurations and transmit signals to a first base station according to each beam configuration of the set of beam configurations for an interference management procedure.

Another apparatus for wireless communication at a second base station is described. The apparatus may include means for receiving messages from one or more UEs served by the second base station according to a set of beam configurations and means for transmitting signals to a first base station according to each beam configuration of the set of beam configurations for an interference management procedure.

A non-transitory computer-readable medium storing code for wireless communication at a second base station is described. The code may include instructions executable by a processor to receive messages from one or more UEs served by the second base station according to a set of beam configurations and transmit signals to a first base station according to each beam configuration of the set of beam configurations for an interference management procedure.

Some examples of the method, apparatuses, and non-transitory computer-readable medium described herein may further include operations, features, means, or instructions for receiving, from the first base station, a request for the second base station to transmit the signals according to the set of beam configurations for the interference management procedure, the signals transmitted to the first base station at least in part in response to the received request.

In some examples of the method, apparatuses, and non-transitory computer-readable medium described herein, transmitting the signals according to the set of beam configurations may include operations, features, means, or instructions for transmitting one or more synchronization signal blocks or channel state information reference signals corresponding to the set of beam configurations.

In some examples of the method, apparatuses, and non-transitory computer-readable medium described herein, receiving the request for the second base station may include operations, features, means, or instructions for receiving, from the first base station, the request including an indication of one or more parameters for the second base station to use to transmit the signals according to the set of beam configurations.

In some examples of the method, apparatuses, and non-transitory computer-readable medium described herein, the one or more parameters include a repetition quantity, a periodicity, a time location, a frequency location, a cross base station interference threshold, or a combination thereof.

Some examples of the method, apparatuses, and non-transitory computer-readable medium described herein may further include operations, features, means, or instructions for transmitting, to the first base station, a measurement configuration that identifies the set of beam configurations and one or more parameters for the set of beam configurations.

In some examples of the method, apparatuses, and non-transitory computer-readable medium described herein, the one or more parameters for the set of beam configurations include quasi-co-location information, a repetition quantity, a periodicity, a time location, a frequency location, a cross base station interference threshold, or a combination thereof, for a measurement procedure to be performed.

A method for wireless communication at a first base station is described. The method may include transmitting, on one or more symbols configured for downlink at the first base station, a first downlink message to one or more UEs served by the first base station using a beam configuration and receiving, from a second base station, a request for the first base station to modify transmissions on the one or more symbols configured for downlink for a second downlink message responsive to the second base station detecting the first downlink message on at least one symbol configured for uplink at the second base station.

An apparatus for wireless communication at a first base station is described. The apparatus may include a processor, memory coupled with the processor, and instructions stored in the memory. The instructions may be executable by the processor to cause the apparatus to transmit, on one or more symbols configured for downlink at the first base station, a first downlink message to one or more UEs served by the first base station using a beam configuration and receive, from a second base station, a request for the first base station to modify transmissions on the one or more symbols configured for downlink for a second downlink message responsive to the second base station detecting the first downlink message on at least one symbol configured for uplink at the second base station.

Another apparatus for wireless communication at a first base station is described. The apparatus may include means for transmitting, on one or more symbols configured for downlink at the first base station, a first downlink message to one or more UEs served by the first base station using a beam configuration and means for receiving, from a second base station, a request for the first base station to modify transmissions on the one or more symbols configured for downlink for a second downlink message responsive to the second base station detecting the first downlink message on at least one symbol configured for uplink at the second base station.

A non-transitory computer-readable medium storing code for wireless communication at a first base station is described. The code may include instructions executable by a processor to transmit, on one or more symbols configured for downlink at the first base station, a first downlink message to one or more UEs served by the first base station using a beam configuration and receive, from a second base station, a request for the first base station to modify transmissions on the one or more symbols configured for downlink for a second downlink message responsive to the second base station detecting the first downlink message on at least one symbol configured for uplink at the second base station.

In some examples of the method, apparatuses, and non-transitory computer-readable medium described herein, the request includes an indication for the first base station to refrain from transmitting on the one or more symbols for the second downlink message.

In some examples of the method, apparatuses, and non-transitory computer-readable medium described herein, the request includes an indication for the first base station to backoff a first transmit power for at least the one or more symbols and the method, apparatuses, and non-transitory computer-readable medium may include further operations, features, means, or instructions for transmitting, responsive to receiving the request, the second downlink message to the one or more UEs on at least one symbol according to a second transmit power less than a first transmit power for the first downlink message.

In some examples of the method, apparatuses, and non-transitory computer-readable medium described herein, the request includes an indication of a second beam configuration for the first base station to use to transmit on the one or more symbols and the method, apparatuses, and non-transitory computer-readable medium may include further operations, features, means, or instructions for transmitting, responsive to receiving the request, the second downlink message according to the second beam configuration.

In some examples of the method, apparatuses, and non-transitory computer-readable medium described herein, the first base station transmits according to the second beam configuration for a quantity of slots indicated by the request.

A method for wireless communication at a second base station is described. The method may include receiving, according to a beam configuration on one or more symbols configured for uplink, a first uplink message from one or more UEs served by the second base station, detecting signals transmitted by a first base station on the one or more symbols configured for uplink, and transmitting a request for the first base station to modify transmissions on the one or more symbols configured for responsive to detecting the signals on the one or more symbols configured for uplink.

An apparatus for wireless communication at a second base station is described. The apparatus may include a processor, memory coupled with the processor, and instructions stored in the memory. The instructions may be executable by the processor to cause the apparatus to receive, according to a beam configuration on one or more symbols configured for uplink, a first uplink message from one or more UEs served by the second base station, detect signals transmitted by a first base station on the one or more symbols configured for uplink, and transmit a request for the first base station to modify transmissions on the one or more symbols configured for responsive to detecting the signals on the one or more symbols configured for uplink.

Another apparatus for wireless communication at a second base station is described. The apparatus may include means for receiving, according to a beam configuration on one or more symbols configured for uplink, a first uplink message from one or more UEs served by the second base station, means for detecting signals transmitted by a first base station on the one or more symbols configured for uplink, and means for transmitting a request for the first base station to modify transmissions on the one or more symbols configured for responsive to detecting the signals on the one or more symbols configured for uplink.

A non-transitory computer-readable medium storing code for wireless communication at a second base station is described. The code may include instructions executable by a processor to receive, according to a beam configuration on one or more symbols configured for uplink, a first uplink message from one or more UEs served by the second base station, detect signals transmitted by a first base station on the one or more symbols configured for uplink, and transmit a request for the first base station to modify transmissions on the one or more symbols configured for responsive to detecting the signals on the one or more symbols configured for uplink.

In some examples of the method, apparatuses, and non-transitory computer-readable medium described herein, the request includes an indication for the first base station to refrain from transmitting on the one or more symbols.

In some examples of the method, apparatuses, and non-transitory computer-readable medium described herein, the request includes an indication for the first base station to backoff a first transmit power for at least the one or more symbols.

In some examples of the method, apparatuses, and non-transitory computer-readable medium described herein, the request includes an indication of a second beam configuration for the first base station to use to transmit on the one or more symbols.

DETAILED DESCRIPTION

Figure 1:
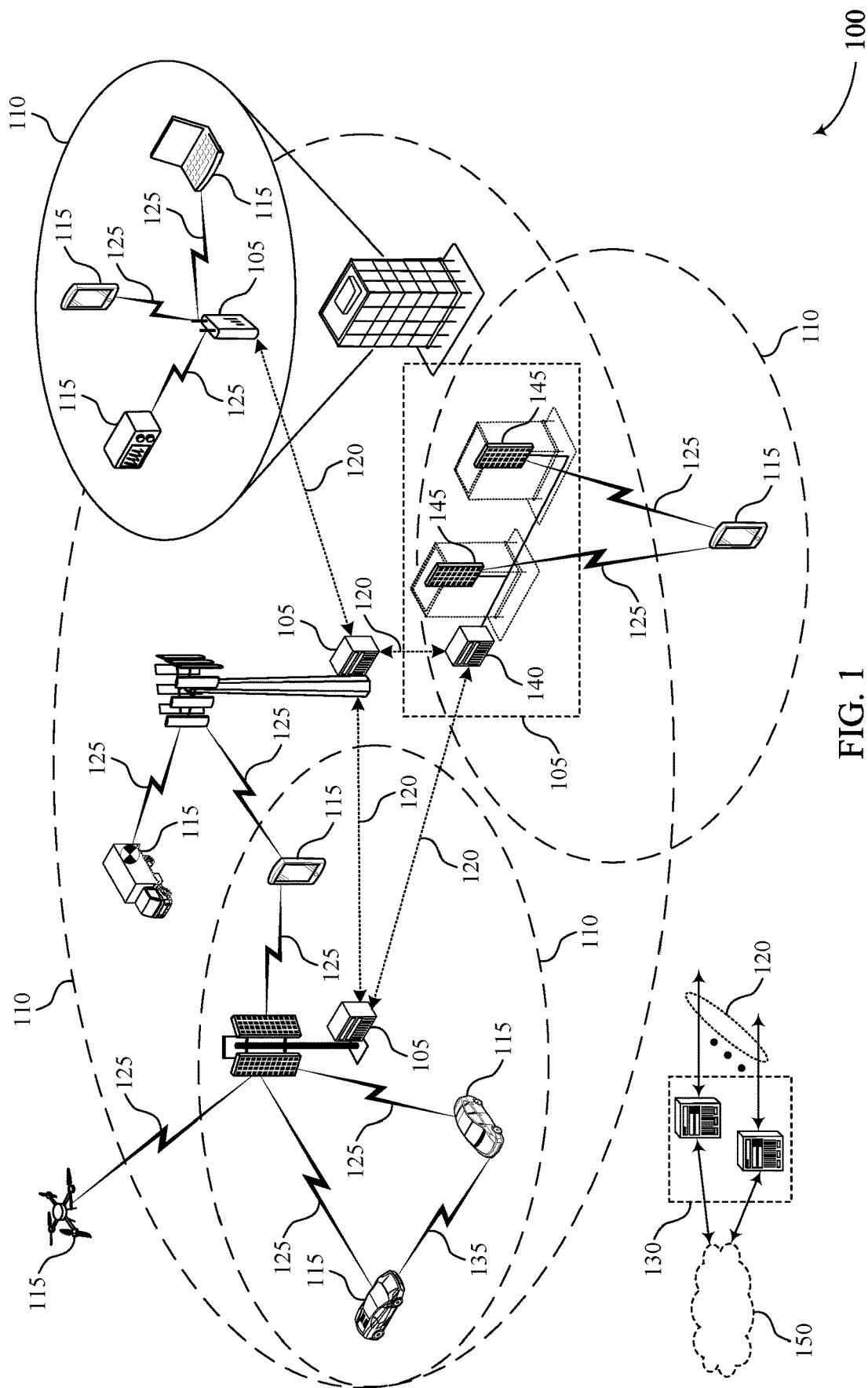
FIG. 1 illustrates an example of a wireless communications system that supports inter-base station beam management procedure in accordance with aspects of the present disclosure.

Aspects of the present disclosure provide techniques to achieve inter-base station beam management to avoid interference during full-duplex (FD) operations, half-duplex (HD) operations, or both, by performing interference management specific to beam configurations. Signaling may be between base stations (e.g., between gNodeBs (gNBs), between nodes of an integrated access and backhaul network, or both). For example, a first base station (e.g., an aggressor base station operating in FD) may determine that one or more transmissions (e.g., downlink transmissions) originating at the first base station is interfering with transmissions (e.g., uplink transmissions) at a second base station (e.g., victim base station operating in FD). Based on the determination, the aggressor base station, the victim base station, or both, may perform one or more operations to mitigate interference.

In some examples, the base stations may utilize proactive feedback to mitigate interference. Aspects of the present disclosure describe utilizing a measurement configuration where an aggressor base station requests measurements from a potential victim base station. The aggressor base station transmits on beams for the victim base station to measure, and the victim base station reports the results of the measurements to the aggressor base station so that the base station may adjust its transmissions to mitigate (e.g., prevent) interference. Aspects of the present disclosure further provide that the victim base station, upon request from the aggressor base station, may transmit signals on different downlink beams that the victim base station uses to receive from user equipments (UEs) served by the victim base station. The aggressor base station may measure the signals to allow the aggressor base station to determine which downlink beams of the aggressor base station may cause interference at the victim base station. The aggressor base station may select transmit beams to use to transmit to served UEs. In such cases, there may not be further feedback from the aggressor base station to the victim base station.

Aspects of the present disclosure further provide for reactive feedback to mitigate interference. For example, when the victim base station detects a transmission from the aggressor base station on one or more symbols configured for uplink at the victim base station, the victim base station may send a request to the aggressor base station for the aggressor base station to modify its transmission on the one or more symbols. Different examples of modifying the transmissions includes for the aggressor base station to stop downlink transmissions on the symbols, reduce transmission power on the symbols, alter one or more beam parameters for the next N number of slots for the symbols, or a combination thereof.

Aspects of the disclosure are initially described in the context of wireless communications systems. Aspects of the disclosure are further illustrated by and described with reference to a process flow. Aspects of the disclosure are further illustrated by and described with reference to apparatus diagrams, system diagrams, and flowcharts that relate to inter-base station beam management procedure.

FIG. 1 illustrates an example of a wireless communications system 100 that supports inter-base station beam management procedure in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, the wireless communications system 100 may utilize FD operations (e.g., simultaneous uplink and downlink transmissions) in one or more frequency ranges. For example, a base station 105 may utilize frequency range 2 (FR2) to perform FD operations with one or more UEs 115. That is, FD capabilities may be implemented at the base station 105, the UEs 115, or both. For example, a UE 115 may utilize a first antenna panel to perform uplink communications while utilizing a second antenna panel to perform downlink reception. Similarly, the base station 105 may utilize a first antenna panel to perform uplink reception and a second antenna panel to perform downlink communications. Additionally or alternatively, the wireless communications system 100 may utilize integrated access and backhaul (IAB) nodes capable of performing FD operations, such as access links with FD capabilities.

Such FD operations may result in latency reduction (e.g., possible to receive downlink signals in uplink designated communications slots), spectral efficiency enhancement per cell, per UE 115, or both, and more efficient resource utilization. For example, a UE 115 may leverage FD capabilities by receiving downlink signaling from a first base station 105 while simultaneously transmitting uplink signaling to a second base station 105 (e.g., FD operations in a multiple transmit and receive point (mTRP) scenario). In a second example of FD utilization, a base station 105 may simultaneously transmit downlink signaling to a first UE 115 while simultaneously receiving uplink signaling from a second UE 115 (e.g., which may utilize IAB infrastructure). As a third example, a base station 105 and a UE 115 may simultaneously exchange uplink and downlink signaling, where both the base station 105 and the UE 115 may perform FD operations.

To utilize FD operations, however, spatial separation (e.g., transmit beam or receive beam, or both, separation) between uplink and downlink beams may affect signaling quality. For example, inadequate beam separation at a device may result in self-interference between downlink and uplink transmissions, clutter echo (e.g., noise from a downlink reception leaching into uplink transmissions), or both. In some cases, there may not exist mechanisms to optimize selected beams (e.g., at the base station 105) to mitigate inter-base station interference. For example, a base station 105 in FD mode, a base station 105 in HD mode but with flexible and misaligned TDD, or both, may experience inter-base station interference.

Aspects of the present disclosure provide techniques to achieve inter-base station beam management to avoid interference during FD operations, HD operations, or both, by performing interference management specific to beam configurations (e.g., for FD, HD, or flexible TDD). As used herein, a beam configuration may also refer to a transmit beam, receive beam, or transmission control indicator (TCI) state associated with UL, DL, SL, or any combination thereof. Signaling may be between base stations (e.g., between gNBs for example using an Xn interface, between nodes of an integrated access and backhaul network for example using an F1 interface, or both). For example, a first base station (e.g., an aggressor base station operating in FD) may determine that one or more transmissions (e.g., downlink transmissions) originating at the first base station is interfering with transmissions (e.g., uplink transmissions) at a second base station (e.g., victim base station operating in FD). Based on the determination, the aggressor base station, the victim base station, or both, may perform one or more operations to mitigate interference. In some cases, the aggressor base station may request measurements from one or more victim base stations. In other examples, the victim base station may request measurements from the aggressor base station. Additionally or alternatively, the victim base station may provide reactive feedback to the aggressor base station upon detecting interference. Implementing interference management for beam configurations, interference experienced between base stations operating in FD, HD, or both, may be reduced, which may improve overall network efficiency and reduce latency.

Figure 2:
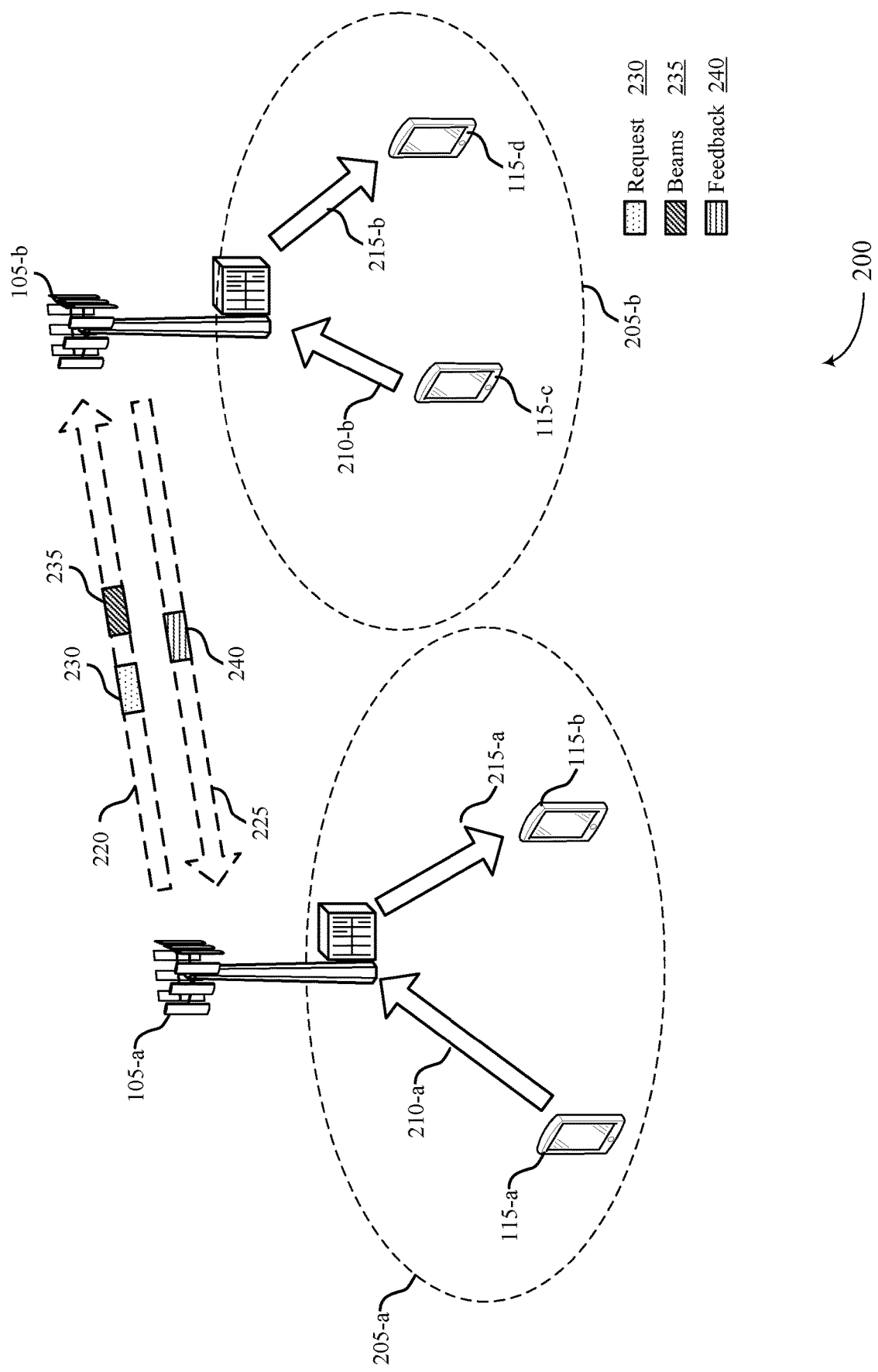
FIG. 2 illustrates an example of a wireless communications system that supports inter-base station beam management procedure in accordance with aspects of the present disclosure.

FIG. 2 illustrates an example of a wireless communications system 200 that supports inter-base station beam management procedure in accordance with aspects of the present disclosure. The wireless communications system 200 may implement or be implemented by one or more aspects of the wireless communications system 100. For example, the wireless communications system 200 may include a UE 115-*a*, a UE 115-*b*, UE 115-*c*, UE 115-*d*, a base station 105-*a*, and a base station 105-*b*, which may be examples of the UE 115 and the base station 105 as described with reference to FIG. 1. The UE 115-*a* may reside within a geographic coverage region 205-*a* associated with the base station 105-*a*, while the UE 115-*b* may reside within a geographic coverage region 205-*b* associated with the base station 105-*b*. It should be noted that, while examples are discussed below, any number of devices and device types may be used to accomplish techniques described in the present disclosure.

In the wireless communications system 200, the base station 105-*a* may serve one or more wireless devices. For example, as illustrated in FIG. 2, the base station 105-*a* serves the UE 115-*a* and the UE 115-*b*. Additionally, the base station 105-*a* may perform uplink signaling and downlink signaling simultaneously in FD mode. For example, the base station 105-*a* may receive uplink signaling from the UE 115-*a* over a communication link 210-*a* while simultaneously transmitting downlink signaling to the UE 115-*b* over a communication link 215-*a*. Similarly, the base station 105-*b* may serve the UE 115-*c* and UE 115-*d* while leveraging FD mode. For example, the base station 105-*b* may receive uplink signaling from the UE 115-*c* over a communication link 210-*b* while simultaneously transmitting downlink signaling to the UE 115-*d* over a communication link 215-*b*.

In some examples, such as those described by the present disclosure, signaling operations at a base station (e.g., base station 105-a) may result in interference at a second base station (e.g., base station 105-b). For example, the downlink signaling performed by the base station 105-a (which may also be referred to as an aggressor base station herein) over the communication link 215-a may be inadvertently received at the base station 105-b (which may also be referred to as a victim base station herein). The base station 105-b may receive the downlink signaling meant for UE 115-b via an inter-base station communication 220.

Aspects of the present disclosure provide interference management techniques (e.g., multiple interference management procedures) for beam management in a FD setting, HD setting, flexible TDD setting, or any combination thereof. Inter-base station beam management procedures may be implemented to identify beams within a set of beams that mitigates (e.g., removes) inter-base station interference, ensures inter-base station over the air (OTA) communication link quality, or both. In some cases, the provided techniques may be implemented when different operators (e.g., different public land mobile network (PLMN) operators) share a common radio frequency spectrum band (e.g., an unlicensed or shared licensed radio frequency spectrum band). It should be understood that, while two base stations are illustrated in FIG. 2, any number of aggressor base stations and victim base stations may perform aspects of the present disclosure. For example, multiple aggressor base stations may exist near a victim base station. In such cases, different aggressor base stations may be TDM for measurement with the victim base station.

To mitigate inter-base station interference, the aggressor base station may request proactive feedback from the victim base station regarding what beams of a set of beams (e.g., beam configurations of a set of beam configurations) may be used for communications with the UEs 115-a and 115-b without resulting in inter-base station interference at the victim base station. Additionally or alternatively, the aggressor base station may request feedback indicating which beams of the set of beams may cause inter-base station interference and how to mitigate the occurrence of such interference.

For example, the aggressor base station may transmit a request 230 to the victim base station to perform an interference management procedure. The request 230 may correspond to a request for the victim base station to perform measurements on one or more beams of the set of beams to determine which beams, if any, may result in inter-base station interference. That is, the aggressor base station may request that the victim base station measure signals (e.g., beams to be used for downlink communication to the UE 115-b) in a measurement procedure according to a set of beam configurations to determine if downlink signaling from the aggressor base station may interfere with the victim base station.

Additionally, the request 230 may include a measurement configuration, which may include each beam used for transmission, associated quasi-co-location (QCL) information, a repetition number, or a combination thereof. In some cases, the request 230 may further include a measurement resource location for the victim base station to utilize for reporting results of the measurements. In some cases, the measurement resource location may differ from reference signal (e.g., beam) locations. Following the request 230, the aggressor base station may transmit one or more beams 235 according to the set of beam configurations (e.g., utilizing one or more synchronization signal blocks (SSBs) using each beam configuration in the set of beam configurations, CSI-RS, or both). In some cases, the aggressor base station may transmit different downlink beams over repetitions on configured time windows, slots, symbols, or a combination thereof.

Based on the one or more beams 235 and the request 230, the victim base station may perform one or more measurements (e.g., as part of the measurement procedure) of the one or more beams 235 using the indicated set of beam configurations. The victim base station may, after performing measurements of the one or more beams 235, transmit feedback 240 over a communication link 225 to the aggressor base station indicating which beams, if any, of the one or more beams 235, may interfere with the victim base station. For example, the victim base station may determine that a downlink beam in the one or more beams 235 causes interference, and may degrade uplink signaling from the UE 115-c. Based on the determination that one or more beams 235 cause inter-base station interference, the victim base station may report beam information, including the determination, to the aggressor base station.

In some cases, the feedback 240 may be transmitted OTA, through backhaul, or both. Additionally or alternatively, the feedback 240 may be periodic or event triggered. The feedback 240 may include one or more measurements regarding the one or more beams 235. For example, the feedback 240 may include an indication of a signal strength (e.g., a reference signal strength indicators (RSSIs), an RSSI indicating interference, reference signal receive power (RSRP), signal-to-interference-plus-noise-ratio (SINR), or a combination thereof) for each transmission and reception beam pair, highest signal strength (e.g., RSSIs) per transmission beam among swept receive beams in a repetition, allowed beams, disallowed beams, or both, or any combination thereof. Based on the feedback 240, the aggressor base station may adjust one or more parameters associated with the one or more beams 235 to mitigate inter-base station interference and subsequently perform communications with the UEs 115-a and 115-b.

As another example, instead of the aggressor base station transmitting one or more beams 235 according to the set of beam configurations for proactive feedback, the aggressor base station may request that the victim base station instead proactively transmit downlink beams that the victim base station may use for uplink reception in response to the request 230. That is, the victim base station may transmit downlink beams using similar beam configurations as uplink beams used by the victim base station to receive uplink signaling from the UE 115-c. In some cases, the downlink beams from the victim base station may be transmitted over repetitions on configured applied time windows, slots, symbols, or any combination thereof.

The aggressor base station may receive the downlink beams from the victim base station, where the aggressor base station may determine, from the downlink beams, which beams may lead to inter-base station interference if utilized by the aggressor base station. In some examples, the victim base station may transmit a measurement configuration to the aggressor base station to enable beam measurements. For example, the victim base station may transmit a measurement configuration indicating, for each beam, corresponding QCL information, a repetition number, a measurement resource location (e.g., which may be different from reference signal locations corresponding to each beam), at interference threshold below which the caused interference may be allowed, or any combination thereof.

Because the victim base station may transmit downlink beams with beam configurations similar to beams used for uplink reception from the UE 115-c, the aggressor base station may determine what beam configurations the victim base station utilizes for uplink reception. The aggressor base station may then determine if any beams within the set of beams used for downlink communication with the UE 115-b may interfere with the downlink beams from the victim base station which, by proxy, may interfere with uplink signaling at the victim base station (e.g., since the downlink beams from the victim base station have similar beam configurations as uplink beams at the victim base station). Based on the beam measurements, the aggressor base station may determine one or more parameters corresponding to the set of beams to mitigate inter-base station interference. For example, the aggressor base station may determine that a beam configuration to be used for downlink signaling to the UE 115-b may interfere with a beam within the set of beams transmitted by the victim base station. Based on the determination, the aggressor base station may limit or cancel utilization of the beam which may lead to inter-base station interference. By determining inter-base station interference at the aggressor base station, there may not exist additional signaling (e.g., feedback signaling) from the aggressor base station to the victim base station.

In other examples, reactive feedback may be utilized. For example, when the victim base station detects a transmission from the aggressor base station (e.g., if the victim base station detects a downlink transmission from the aggressor base station in a radio resource control (RRC) common uplink signal), the victim base station may signal the aggressor base station to mitigate potential inter-base station interference. For example, the victim base station may signal the aggressor base station to stop downlink transmissions, reduce transmission power of the downlink transmissions, recommend one or more beams for the aggressor base station to use in a number of following slots via OTA, backhaul, or both.

Figure 3:
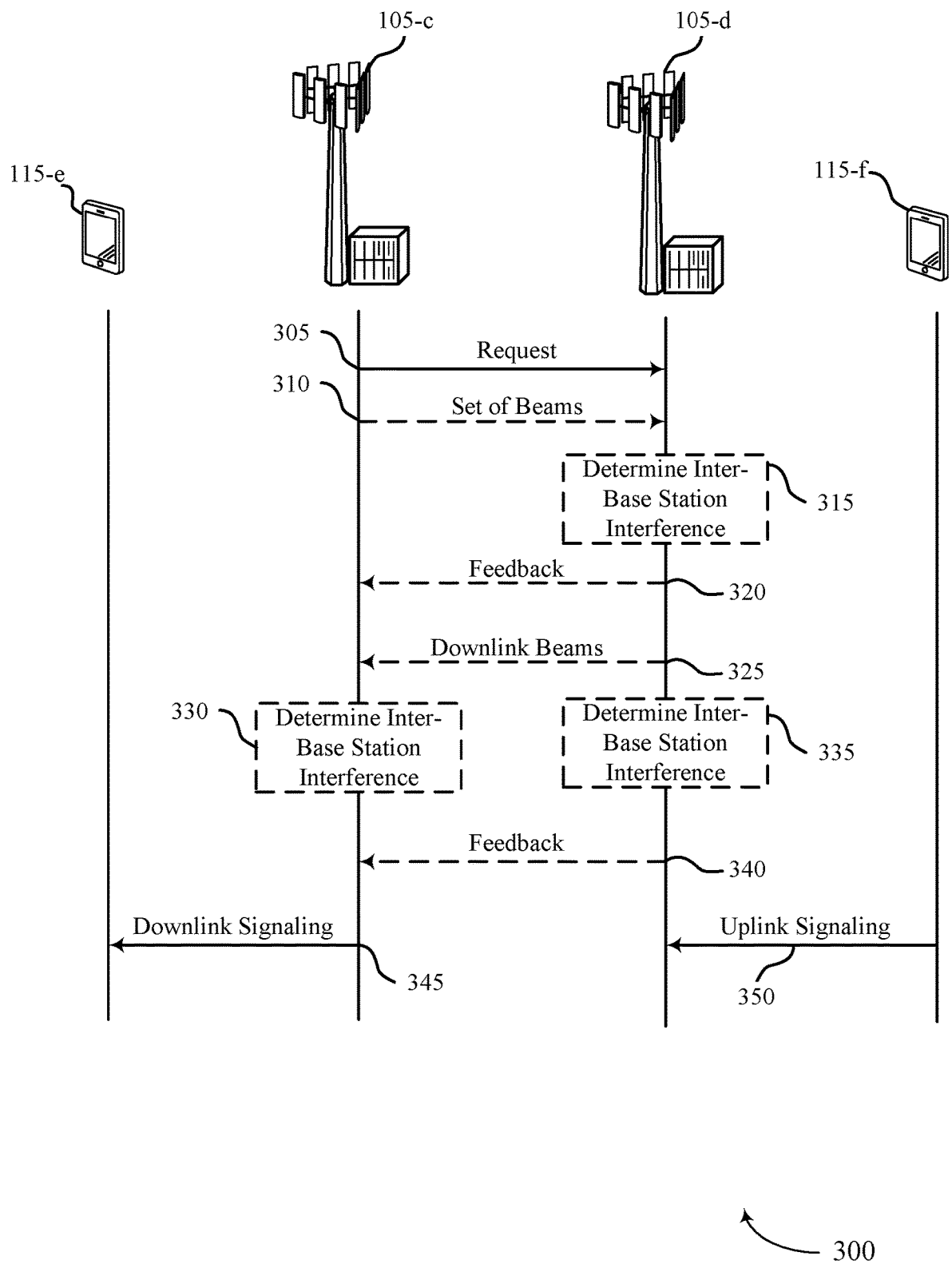
FIG. 3 illustrates an example of a process flow that supports inter-base station beam management procedure in accordance with aspects of the present disclosure.

FIG. 3 illustrates an example of a process flow 300 that supports inter-base station beam management procedure in accordance with aspects of the present disclosure. The process flow 300 may be implemented by one or more aspects of the wireless communications system 100 and the wireless communications system 200. For example, the process flow 300 may correspond to communications between a UE 115-e, a UE 115-f, a base station 105-c, and a base station 105-d, which may be examples of the UE 115 and the base station 105 as described with reference to FIG. 1. It should be noted that, while examples are discussed below, any number of devices and device types may be used to accomplish implementations described in the present disclosure. In the following description of the process flow 300, operations between the UE 115-e, the UE 115-f, the base station 105-c, and the base station 105-d may occur in a different order or at different times than as shown. Some operations may also be omitted from the process flow 300, and other operations may be added to the process flow 300.

At 305, the base station 105-c (e.g., the aggressor base station) may transmit a request to the base station 105-d (e.g., the victim base station) to perform one or more interference management procedures. In some cases, the request may include one or more beam configurations corresponding to beams the aggressor base station may utilize (e.g., for downlink communications to the UE 115-e). In some cases, the request may include one or more measurement configurations, which may be transmitted or received by a central unit (e.g., an IAB central unit) associated with the aggressor base station, the victim base station, or both, for example when one or more of the base stations include or are DUs of an IAB network. Optionally, at 310, the aggressor base station may transmit on a set of beams (e.g., each conveying one or more SSBs, or reference signals) corresponding to the one or more beam configurations. Optionally, at 315, the victim base station may determine inter-base station interference based on the request at 305 and, optionally, the set of beams at 310. Based on the determination of inter-base station interference, the victim base station may transmit feedback at 320 to notify the aggressor base station of one or more beams that may result in inter-base station interference.

In some cases, instead of the aggressor base station transmitting a set of beams at 310 and the victim base station determining inter-base station interference at 320, the victim base station may transmit downlink beams at 325 to the aggressor base station. As discussed with reference to FIG. 2, the downlink beams at 325 may correspond to beams utilized by the victim base station to receive uplink signaling from the UE 115-f. In such cases, instead of the victim base station determining potential inter-base station interference, the aggressor base station may, at 330, determine inter-base station interference based on the downlink beams transmitted by the victim base station. In such cases, based on the determination, the aggressor base station may modify one or more parameters associated with a beam configuration that may lead to inter-base station interference.

Optionally, at 335, the victim base station may perform reactive feedback regarding inter-base station interference. For example, the victim base station may determine that one or more downlink signals from the aggressor base station are present in an uplink symbol (e.g., in RRC) at the victim base station (e.g., there exists inter-base station interference). Based on determining inter-base station interference, at 340, the victim base station may transmit feedback to the aggressor base station indicating the presence of inter-base station interference. Based on the feedback, the aggressor base station may modify one or more parameters associated with beam configurations used by the aggressor base station.

Based on any number or combination of the procedures above, the aggressor base station may cancel utilization of one or more beams, alter transmission power associated with one or more beams, or both. At 345, the aggressor base station may perform downlink signaling with the UE 115-e while the victim base station, at 350, performs uplink signaling with the UE 115-f.

Figure 4:
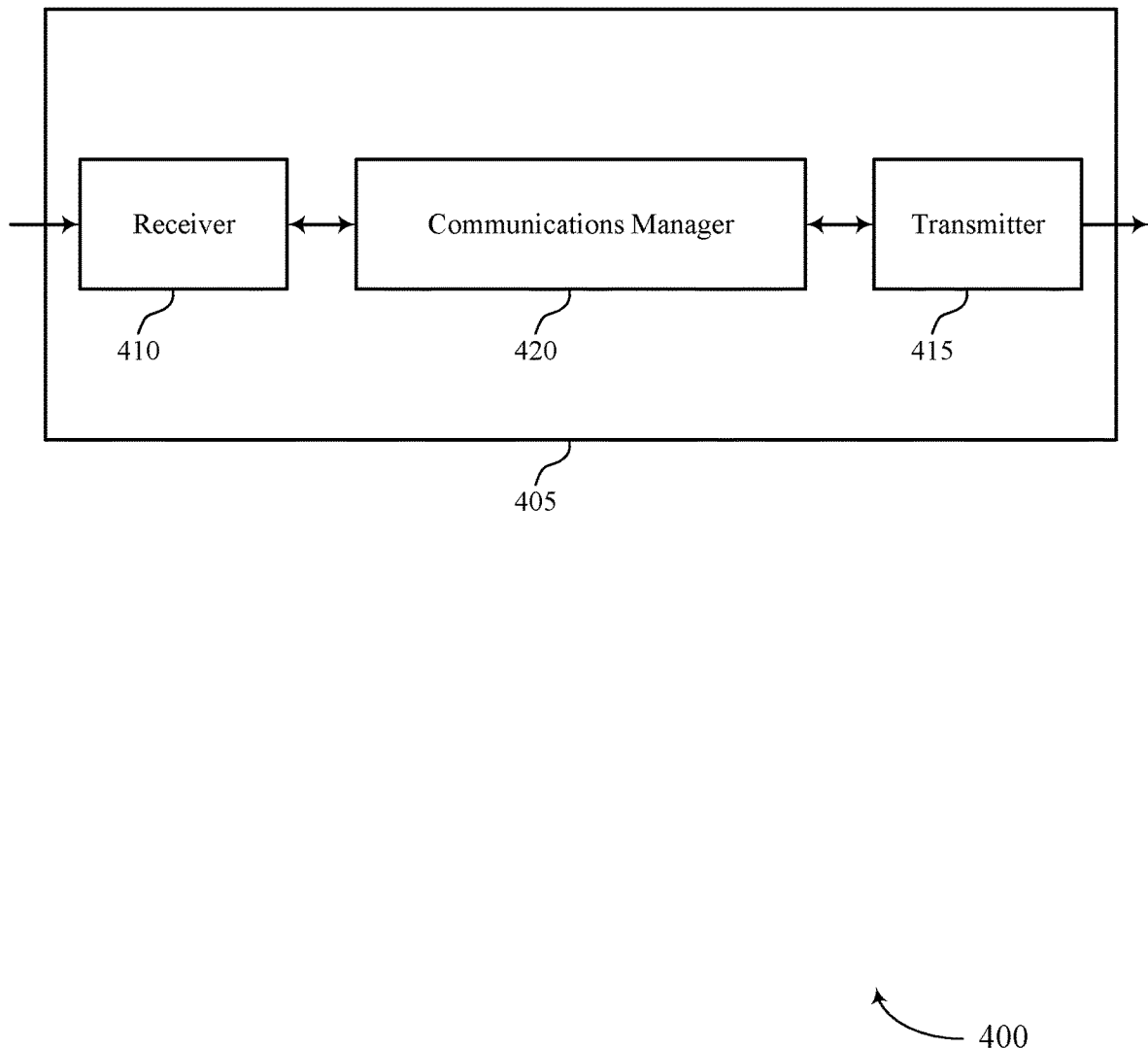
FIGS. 4 and 5 show block diagrams of devices that support inter-base station beam management procedure in accordance with aspects of the present disclosure.

FIG. 4 shows a block diagram 400 of a device 405 that supports inter-base station beam management procedure in accordance with aspects of the present disclosure. The device 405 may be an example of aspects of a base station 105 as described herein. The device 405 may include a receiver 410, a transmitter 415, and a communications manager 420. The device 405 may also include one or more processors, memory coupled with the one or more processors, and instructions stored in the memory that are executable by the one or more processors to enable the one or more processors to perform inter-base station beam management features discussed herein. Each of these components may be in communication with one another (e.g., via one or more buses).

The receiver 410 may provide a means for receiving information such as packets, user data, control information, or any combination thereof associated with various information channels (e.g., control channels, data channels, information channels related to inter-base station beam management procedure). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to inter-base station beam management procedure). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of inter-base station beam management procedure as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a first base station in accordance with examples as disclosed herein. For example, the communications manager 420 may be configured as or otherwise support a means for transmitting signals according to each beam configuration of a set of beam configurations for an interference management procedure. The communications manager 420 may be configured as or otherwise support a means for receiving, from a second base station, a report that indicates a set of measurement results and identifies one or more beam configurations of the set of beam configurations corresponding to the set of measurement results. The communications manager 420 may be configured as or otherwise support a means for transmitting to one or more user equipments (UEs) served by the first base station according to a beam configuration selected by the first base station based on the report.

Additionally or alternatively, the communications manager 420 may support wireless communication at a second base station in accordance with examples as disclosed herein. For example, the communications manager 420 may be configured as or otherwise support a means for receiving signals transmitted by a first base station according to each beam configuration of a set of beam configurations for an interference management procedure. The communications manager 420 may be configured as or otherwise support a means for transmitting, in response to the received signals, a report that indicates a set of measurement results and identifies one or more beam configurations of the set of beam configurations corresponding to the set of measurement results.

Additionally or alternatively, the communications manager 420 may support wireless communication at a first base station in accordance with examples as disclosed herein. For example, the communications manager 420 may be configured as or otherwise support a means for receiving signals from a second base station according to each beam configuration of a set of beam configurations for an interference management procedure. The communications manager 420 may be configured as or otherwise support a means for selecting a beam configuration to use to transmit to one or more user equipments (UEs) served by the first base station based on a measurement procedure performed on the signals received from the second base station. The communications manager 420 may be configured as or otherwise support a means for transmitting to the one or more UEs according to the selected beam configuration.

Additionally or alternatively, the communications manager 420 may support wireless communication at a second base station in accordance with examples as disclosed herein. For example, the communications manager 420 may be configured as or otherwise support a means for receiving messages from one or more user equipments (UEs) served by the second base station according to a set of beam configurations. The communications manager 420 may be configured as or otherwise support a means for transmitting signals to a first base station according to each beam configuration of the set of beam configurations for an interference management procedure.

Additionally or alternatively, the communications manager 420 may support wireless communication at a first base station in accordance with examples as disclosed herein. For example, the communications manager 420 may be configured as or otherwise support a means for transmitting, on one or more symbols configured for downlink at the first base station, a first downlink message to one or more user equipments (UEs) served by the first base station using a beam configuration. The communications manager 420 may be configured as or otherwise support a means for receiving, from a second base station, a request for the first base station to modify transmissions on the one or more symbols configured for downlink for a second downlink message responsive to the second base station detecting the first downlink message on at least one symbol configured for uplink at the second base station.

Additionally or alternatively, the communications manager 420 may support wireless communication at a second base station in accordance with examples as disclosed herein. For example, the communications manager 420 may be configured as or otherwise support a means for receiving, according to a beam configuration on one or more symbols configured for uplink, a first uplink message from one or more user equipments (UEs) served by the second base station. The communications manager 420 may be configured as or otherwise support a means for detecting signals transmitted by a first base station on the one or more symbols configured for uplink. The communications manager 420 may be configured as or otherwise support a means for transmitting a request for the first base station to modify transmissions on the one or more symbols configured for responsive to detecting the signals on the one or more symbols configured for uplink.

Figure 5:
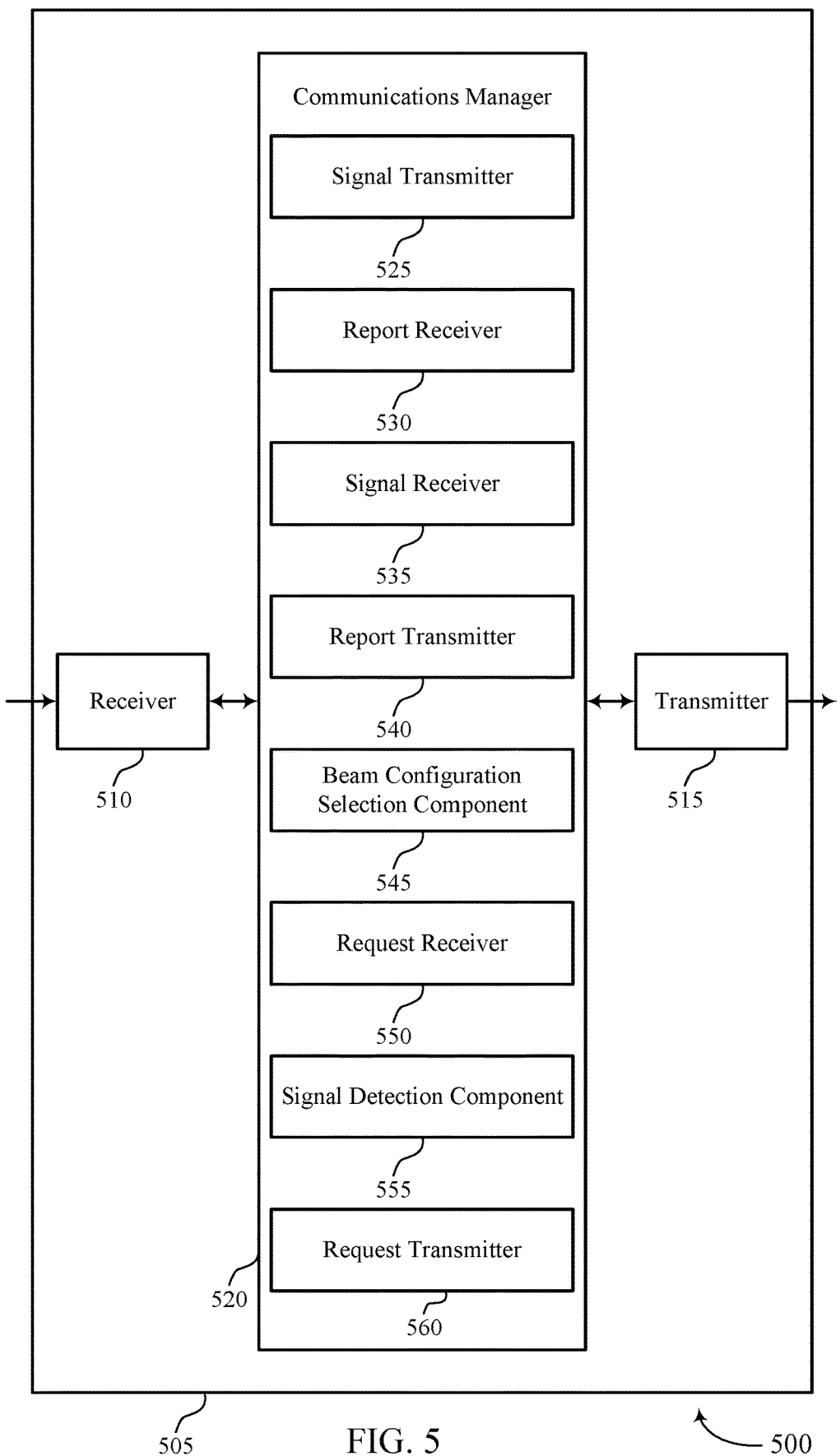

By including or configuring the communications manager 420 in accordance with examples as described herein, the device 405 (e.g., a processor controlling or otherwise coupled to the receiver 410, the transmitter 415, the communications manager 420, or a combination thereof) may support techniques for FIG. 5 shows a block diagram 500 of a device 505 that supports inter-base station beam management procedure in accordance with aspects of the present disclosure. The device 505 may be an example of aspects of a device 405 or a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to inter-base station beam management procedure). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to inter-base station beam management procedure). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of inter-base station beam management procedure as described herein. For example, the communications manager 520 may include a signal transmitter 525, a report receiver 530, a signal receiver 535, a report transmitter 540, a beam configuration selection component 545, a request receiver 550, a signal detection component 555, a request transmitter 560, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first base station in accordance with examples as disclosed herein. The signal transmitter 525 may be configured as or otherwise support a means for transmitting signals according to each beam configuration of a set of beam configurations for an interference management procedure. The report receiver 530 may be configured as or otherwise support a means for receiving, from a second base station, a report that indicates a set of measurement results and identifies one or more beam configurations of the set of beam configurations corresponding to the set of measurement results. The signal transmitter 525 may be configured as or otherwise support a means for transmitting to one or more user equipments (UEs) served by the first base station according to a beam configuration selected by the first base station based on the report.

Additionally or alternatively, the communications manager 520 may support wireless communication at a second base station in accordance with examples as disclosed herein. The signal receiver 535 may be configured as or otherwise support a means for receiving signals transmitted by a first base station according to each beam configuration of a set of beam configurations for an interference management procedure. The report transmitter 540 may be configured as or otherwise support a means for transmitting, in response to the received signals, a report that indicates a set of measurement results and identifies one or more beam configurations of the set of beam configurations corresponding to the set of measurement results.

Additionally or alternatively, the communications manager 520 may support wireless communication at a first base station in accordance with examples as disclosed herein. The signal receiver 535 may be configured as or otherwise support a means for receiving signals from a second base station according to each beam configuration of a set of beam configurations for an interference management procedure. The beam configuration selection component 545 may be configured as or otherwise support a means for selecting a beam configuration to use to transmit to one or more user equipments (UEs) served by the first base station based on a measurement procedure performed on the signals received from the second base station. The signal transmitter 525 may be configured as or otherwise support a means for transmitting to the one or more UEs according to the selected beam configuration.

Additionally or alternatively, the communications manager 520 may support wireless communication at a second base station in accordance with examples as disclosed herein. The signal receiver 535 may be configured as or otherwise support a means for receiving messages from one or more user equipments (UEs) served by the second base station according to a set of beam configurations. The signal transmitter 525 may be configured as or otherwise support a means for transmitting signals to a first base station according to each beam configuration of the set of beam configurations for an interference management procedure.

Additionally or alternatively, the communications manager 520 may support wireless communication at a first base station in accordance with examples as disclosed herein. The signal transmitter 525 may be configured as or otherwise support a means for transmitting, on one or more symbols configured for downlink at the first base station, a first downlink message to one or more user equipments (UEs) served by the first base station using a beam configuration. The request receiver 550 may be configured as or otherwise support a means for receiving, from a second base station, a request for the first base station to modify transmissions on the one or more symbols configured for downlink for a second downlink message responsive to the second base station detecting the first downlink message on at least one symbol configured for uplink at the second base station.

Additionally or alternatively, the communications manager 520 may support wireless communication at a second base station in accordance with examples as disclosed herein. The signal receiver 535 may be configured as or otherwise support a means for receiving, according to a beam configuration on one or more symbols configured for uplink, a first uplink message from one or more user equipments (UEs) served by the second base station. The signal detection component 555 may be configured as or otherwise support a means for detecting signals transmitted by a first base station on the one or more symbols configured for uplink. The request transmitter 560 may be configured as or otherwise support a means for transmitting a request for the first base station to modify transmissions on the one or more symbols configured for responsive to detecting the signals on the one or more symbols configured for uplink.

In some cases, the signal transmitter 525, the report receiver 530, the signal receiver 535, the report transmitter 540, the beam configuration selection component 545, the request receiver 550, the signal detection component 555, the request transmitter 560, or any combination thereof, may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the signal transmitter 525, the report receiver 530, the signal receiver 535, the report transmitter 540, the beam configuration selection component 545, the request receiver 550, the signal detection component 555, the request transmitter 560, or any combination thereof, discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 6:
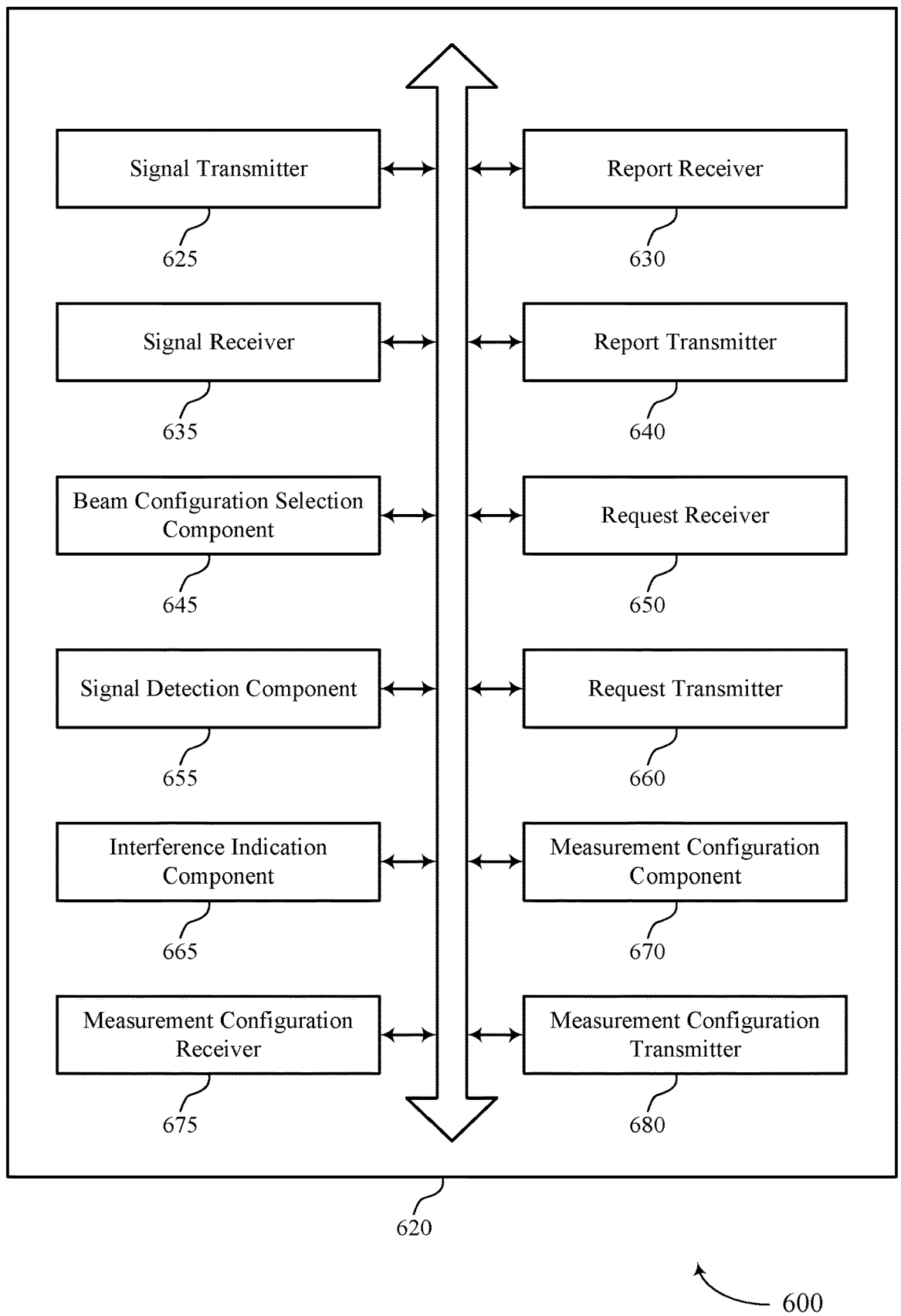
FIG. 6 shows a block diagram of a communications manager that supports inter-base station beam management procedure in accordance with aspects of the present disclosure.

FIG. 6 shows a block diagram 600 of a communications manager 620 that supports inter-base station beam management procedure in accordance with aspects of the present disclosure. The communications manager 620 may be an example of aspects of a communications manager 420, a communications manager 520, or both, as described herein. The communications manager 620, or various components thereof, may be an example of means for performing various aspects of inter-base station beam management procedure as described herein. For example, the communications manager 620 may include a signal transmitter 625, a report receiver 630, a signal receiver 635, a report transmitter 640, a beam configuration selection component 645, a request receiver 650, a signal detection component 655, a request transmitter 660, an interference indication component 665, a measurement configuration component 670, a measurement configuration receiver 675, a measurement configuration transmitter 680, or any combination thereof. Each of these components may communicate, directly or indirectly, with one another (e.g., via one or more buses).

The communications manager 620 may support wireless communication at a first base station in accordance with examples as disclosed herein. The signal transmitter 625 may be configured as or otherwise support a means for transmitting signals according to each beam configuration of a set of beam configurations for an interference management procedure. The report receiver 630 may be configured as or otherwise support a means for receiving, from a second base station, a report that indicates a set of measurement results and identifies one or more beam configurations of the set of beam configurations corresponding to the set of measurement results. In some examples, the signal transmitter 625 may be configured as or otherwise support a means for transmitting to one or more user equipments (UEs) served by the first base station according to a beam configuration selected by the first base station based on the report.

In some examples, the request transmitter 660 may be configured as or otherwise support a means for transmitting, to the second base station, a request for the second base station to measure the signals transmitted by the first base station according to the set of beam configurations, the report received at least in part in response to the transmitted request.

In some examples, to support transmitting the signals according to each beam configuration of the set of beam configurations, the signal transmitter 625 may be configured as or otherwise support a means for transmitting one or more synchronization signal blocks or channel state information reference signals using each beam configuration of the set of beam configurations, where the one or more beam configurations identified by the report correspond to one or more of the one or more synchronization signal blocks or channel state information reference signals.

In some examples, to support receiving the report, the interference indication component 665 may be configured as or otherwise support a means for receiving, from the second base station, an indication of a cross base station interference signal strength associated with interference between base stations and associated with at least one beam pair that includes at least one beam configuration of the set of beam configurations and a receive beam of the second base station, a highest signal strength from a set of cross base station interference signal strengths associated with the set of beam configurations and a set of receive beams of the second base station, one or more beam configurations that are allowed by the second base station, one or more beam configurations that are disallowed by the second base station, or any combination thereof.

In some examples, the measurement configuration component 670 may be configured as or otherwise support a means for communicating a measurement configuration that identifies the set of beam configurations and one or more parameters for the set of beam configurations.

In some examples, the one or more parameters for the set of beam configurations include quasi-co-location information, a repetition quantity, a periodicity, a time location, a frequency location, a cross base station interference threshold, or a combination thereof, for a measurement procedure to be performed.

In some examples, to support communicating the measurement configuration, the measurement configuration receiver 675 may be configured as or otherwise support a means for receiving the measurement configuration from the second base station. In some examples, to support communicating the measurement configuration, the measurement configuration receiver 675 may be configured as or otherwise support a means for receiving the measurement configuration from a central unit associated with the first base station, the second base station, or both. In some examples, to support communicating the measurement configuration, the measurement configuration receiver 675 may be configured as or otherwise support a means for any combination thereof.

Additionally or alternatively, the communications manager 620 may support wireless communication at a second base station in accordance with examples as disclosed herein. The signal receiver 635 may be configured as or otherwise support a means for receiving signals transmitted by a first base station according to each beam configuration of a set of beam configurations for an interference management procedure. The report transmitter 640 may be configured as or otherwise support a means for transmitting, in response to the received signals, a report that indicates a set of measurement results and identifies one or more beam configurations of the set of beam configurations corresponding to the set of measurement results.

In some examples, the request receiver 650 may be configured as or otherwise support a means for receiving, from the first base station, a request for the second base station to measure signals transmitted by the first base station according to the set of beam configurations.

In some examples, to support receiving the signals according to each beam configuration of the set of beam configurations, the signal receiver 635 may be configured as or otherwise support a means for receiving one or more synchronization signal blocks or channel state information reference signals using each beam configuration of the set of beam configurations, where the one or more beam configurations identified by the report correspond to one or more of the one or more synchronization signal blocks or channel state information reference signals.

In some examples, to support transmitting the report, the interference indication component 665 may be configured as or otherwise support a means for transmitting an indication of a cross base station interference signal strength associated with at least one beam pair that includes at least one beam configuration of the set of beam configurations and a receive beam of the second base station, a highest signal strength from a set of cross base station interference signal strengths associated with the set of beam configurations and a set of receive beams of the second base station, one or more beam configurations that are allowed by the second base station, one or more beam configurations that are disallowed by the second base station, or any combination thereof.

In some examples, the measurement configuration component 670 may be configured as or otherwise support a means for communicating a measurement configuration that identifies the set of beam configurations and one or more parameters for the set of beam configurations.

Additionally or alternatively, the communications manager 620 may support wireless communication at a first base station in accordance with examples as disclosed herein. In some examples, the signal receiver 635 may be configured as or otherwise support a means for receiving signals from a second base station according to each beam configuration of a set of beam configurations for an interference management procedure. The beam configuration selection component 645 may be configured as or otherwise support a means for selecting a beam configuration to use to transmit to one or more user equipments (UEs) served by the first base station based on a measurement procedure performed on the signals received from the second base station. In some examples, the signal transmitter 625 may be configured as or otherwise support a means for transmitting to the one or more UEs according to the selected beam configuration.

In some examples, the request transmitter 660 may be configured as or otherwise support a means for transmitting, to the second base station, a request for the second base station to transmit the signals according to the set of beam configurations for the interference management procedure.

In some examples, to support receiving the signals from the second base station according to the set of beam configurations, the signal receiver 635 may be configured as or otherwise support a means for receiving one or more synchronization signal blocks or channel state information reference signals corresponding to the set of beam configurations.

In some examples, to support transmitting the request for the second base station, the request transmitter 660 may be configured as or otherwise support a means for transmitting, to the second base station, the request including an indication of one or more parameters for the second base station to use to transmit the signals according to the set of beam configurations.

In some examples, the measurement configuration receiver 675 may be configured as or otherwise support a means for receiving a measurement configuration that identifies the set of beam configurations and one or more parameters for the set of beam configurations.

In some examples, the one or more parameters for the set of beam configurations include quasi-co-location information, a repetition quantity, a periodicity, a time location, a frequency location, a cross base station interference threshold, or a combination thereof, for the measurement procedure to be performed.

In some examples, to support receiving the measurement configuration, the measurement configuration receiver 675 may be configured as or otherwise support a means for receiving the measurement configuration from the second base station. In some examples, to support receiving the measurement configuration, the measurement configuration receiver 675 may be configured as or otherwise support a means for receiving the measurement configuration from a central unit associated with the first base station, the second base station, or both. In some examples, to support receiving the measurement configuration, the measurement configuration receiver 675 may be configured as or otherwise support a means for any combination thereof.

Additionally or alternatively, the communications manager 620 may support wireless communication at a second base station in accordance with examples as disclosed herein. In some examples, the signal receiver 635 may be configured as or otherwise support a means for receiving messages from one or more user equipments (UEs) served by the second base station according to a set of beam configurations. In some examples, the signal transmitter 625 may be configured as or otherwise support a means for transmitting signals to a first base station according to each beam configuration of the set of beam configurations for an interference management procedure.

In some examples, the request receiver 650 may be configured as or otherwise support a means for receiving, from the first base station, a request for the second base station to transmit the signals according to the set of beam configurations for the interference management procedure, the signals transmitted to the first base station at least in part in response to the received request.

In some examples, to support transmitting the signals according to the set of beam configurations, the signal transmitter 625 may be configured as or otherwise support a means for transmitting one or more synchronization signal blocks or channel state information reference signals corresponding to the set of beam configurations.

In some examples, to support receiving the request for the second base station, the request receiver 650 may be configured as or otherwise support a means for receiving, from the first base station, the request including an indication of one or more parameters for the second base station to use to transmit the signals according to the set of beam configurations.

In some examples, the one or more parameters include a repetition quantity, a periodicity, a time location, a frequency location, a cross base station interference threshold, or a combination thereof.

In some examples, the measurement configuration transmitter 680 may be configured as or otherwise support a means for transmitting, to the first base station, a measurement configuration that identifies the set of beam configurations and one or more parameters for the set of beam configurations.

In some examples, the one or more parameters for the set of beam configurations include quasi-co-location information, a repetition quantity, a periodicity, a time location, a frequency location, a cross base station interference threshold, or a combination thereof, for a measurement procedure to be performed.

Additionally or alternatively, the communications manager 620 may support wireless communication at a first base station in accordance with examples as disclosed herein. In some examples, the signal transmitter 625 may be configured as or otherwise support a means for transmitting, on one or more symbols configured for downlink at the first base station, a first downlink message to one or more user equipments (UEs) served by the first base station using a beam configuration. The request receiver 650 may be configured as or otherwise support a means for receiving, from a second base station, a request for the first base station to modify transmissions on the one or more symbols configured for downlink for a second downlink message responsive to the second base station detecting the first downlink message on at least one symbol configured for uplink at the second base station.

In some examples, the request includes an indication for the first base station to refrain from transmitting on the one or more symbols for the second downlink message.

In some examples, the request includes an indication for the first base station to backoff a first transmit power for at least the one or more symbols, and the signal transmitter 625 may be configured as or otherwise support a means for transmitting, responsive to receiving the request, the second downlink message to the one or more UEs on at least one symbol according to a second transmit power less than a first transmit power for the first downlink message.

In some examples, the request includes an indication of a second beam configuration for the first base station to use to transmit on the one or more symbols, and the signal transmitter 625 may be configured as or otherwise support a means for transmitting, responsive to receiving the request, the second downlink message according to the second beam configuration.

In some examples, the first base station transmits according to the second beam configuration for a quantity of slots indicated by the request.

Additionally or alternatively, the communications manager 620 may support wireless communication at a second base station in accordance with examples as disclosed herein. In some examples, the signal receiver 635 may be configured as or otherwise support a means for receiving, according to a beam configuration on one or more symbols configured for uplink, a first uplink message from one or more user equipments (UEs) served by the second base station. The signal detection component 655 may be configured as or otherwise support a means for detecting signals transmitted by a first base station on the one or more symbols configured for uplink. The request transmitter 660 may be configured as or otherwise support a means for transmitting a request for the first base station to modify transmissions on the one or more symbols configured for responsive to detecting the signals on the one or more symbols configured for uplink.

In some examples, the request includes an indication for the first base station to refrain from transmitting on the one or more symbols.

In some examples, the request includes an indication for the first base station to backoff a first transmit power for at least the one or more symbols.

In some examples, the request includes an indication of a second beam configuration for the first base station to use to transmit on the one or more symbols.

In some cases, the signal transmitter 625, the report receiver 630, the signal receiver 635, the report transmitter 640, the beam configuration selection component 645, the request receiver 650, the signal detection component 655, the request transmitter 660, the interference indication component 665, the measurement configuration component 670, the measurement configuration receiver 675, the measurement configuration transmitter 680, or any combination thereof, may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the signal transmitter 625, the report receiver 630, the signal receiver 635, the report transmitter 640, the beam configuration selection component 645, the request receiver 650, the signal detection component 655, the request transmitter 660, the interference indication component 665, the measurement configuration component 670, the measurement configuration receiver 675, the measurement configuration transmitter 680, or any combination thereof, discussed herein.

Figure 7:
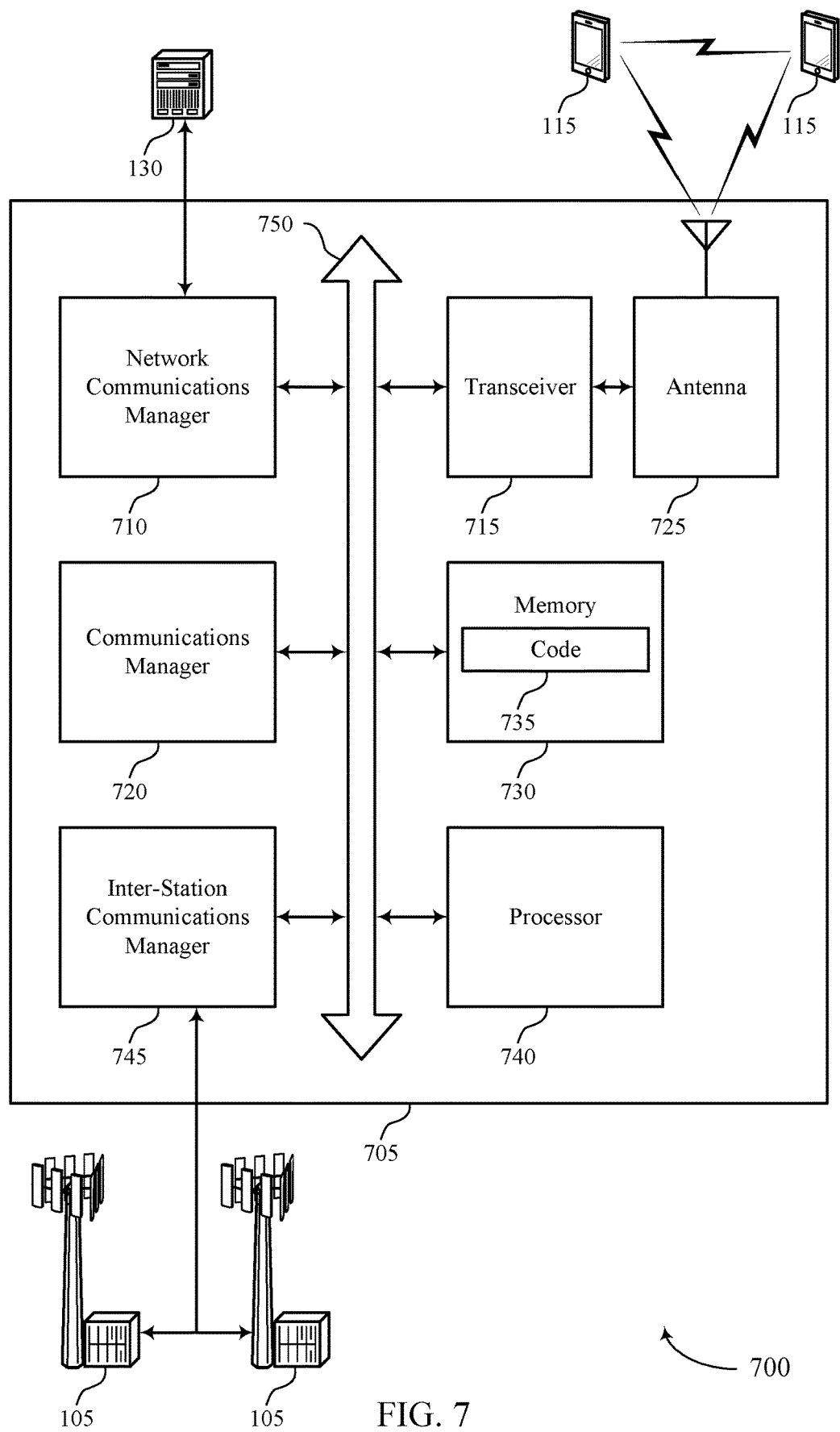
FIG. 7 shows a diagram of a system including a device that supports inter-base station beam management procedure in accordance with aspects of the present disclosure.

FIG. 7 shows a diagram of a system 700 including a device 705 that supports inter-base station beam management procedure in accordance with aspects of the present disclosure. The device 705 may be an example of or include the components of a device 405, a device 505, or a base station 105 as described herein. The device 705 may communicate wirelessly with one or more base stations 105, UEs 115, or any combination thereof. The device 705 may include components for bi-directional voice and data communications including components for transmitting and receiving communications, such as a communications manager 720, a network communications manager 710, a transceiver 715, an antenna 725, a memory 730, code 735, a processor 740, and an inter-station communications manager 745. These components may be in electronic communication or otherwise coupled (e.g., operatively, communicatively, functionally, electronically, electrically) via one or more buses (e.g., a bus 750).

The network communications manager 710 may manage communications with a core network 130 (e.g., via one or more wired backhaul links). For example, the network communications manager 710 may manage the transfer of data communications for client devices, such as one or more UEs 115.

In some cases, the device 705 may include a single antenna 725. However, in some other cases the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include RAM and ROM. The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a BIOS which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting inter-base station beam management procedure). For example, the device 705 or a component of the device 705 may include a processor 740 and memory 730 coupled to the processor 740, the processor 740 and memory 730 configured to perform various functions described herein.

The inter-station communications manager 745 may manage communications with other base stations 105, and may include a controller or scheduler for controlling communications with UEs 115 in cooperation with other base stations 105. For example, the inter-station communications manager 745 may coordinate scheduling for transmissions to UEs 115 for various interference mitigation techniques such as beamforming or joint transmission. In some examples, the inter-station communications manager 745 may provide an X2 interface within an LTE/LTE-A wireless communications network technology to provide communication between base stations 105.

The communications manager 720 may support wireless communication at a first base station in accordance with examples as disclosed herein. For example, the communications manager 720 may be configured as or otherwise support a means for transmitting signals according to each beam configuration of a set of beam configurations for an interference management procedure. The communications manager 720 may be configured as or otherwise support a means for receiving, from a second base station, a report that indicates a set of measurement results and identifies one or more beam configurations of the set of beam configurations corresponding to the set of measurement results. The communications manager 720 may be configured as or otherwise support a means for transmitting to one or more user equipments (UEs) served by the first base station according to a beam configuration selected by the first base station based on the report.

Additionally or alternatively, the communications manager 720 may support wireless communication at a second base station in accordance with examples as disclosed herein. For example, the communications manager 720 may be configured as or otherwise support a means for receiving signals transmitted by a first base station according to each beam configuration of a set of beam configurations for an interference management procedure. The communications manager 720 may be configured as or otherwise support a means for transmitting, in response to the received signals, a report that indicates a set of measurement results and identifies one or more beam configurations of the set of beam configurations corresponding to the set of measurement results.

Additionally or alternatively, the communications manager 720 may support wireless communication at a first base station in accordance with examples as disclosed herein. For example, the communications manager 720 may be configured as or otherwise support a means for receiving signals from a second base station according to each beam configuration of a set of beam configurations for an interference management procedure. The communications manager 720 may be configured as or otherwise support a means for selecting a beam configuration to use to transmit to one or more user equipments (UEs) served by the first base station based on a measurement procedure performed on the signals received from the second base station. The communications manager 720 may be configured as or otherwise support a means for transmitting to the one or more UEs according to the selected beam configuration.

Additionally or alternatively, the communications manager 720 may support wireless communication at a second base station in accordance with examples as disclosed herein. For example, the communications manager 720 may be configured as or otherwise support a means for receiving messages from one or more user equipments (UEs) served by the second base station according to a set of beam configurations. The communications manager 720 may be configured as or otherwise support a means for transmitting signals to a first base station according to each beam configuration of the set of beam configurations for an interference management procedure.

Additionally or alternatively, the communications manager 720 may support wireless communication at a first base station in accordance with examples as disclosed herein. For example, the communications manager 720 may be configured as or otherwise support a means for transmitting, on one or more symbols configured for downlink at the first base station, a first downlink message to one or more user equipments (UEs) served by the first base station using a beam configuration. The communications manager 720 may be configured as or otherwise support a means for receiving, from a second base station, a request for the first base station to modify transmissions on the one or more symbols configured for downlink for a second downlink message responsive to the second base station detecting the first downlink message on at least one symbol configured for uplink at the second base station.

Additionally or alternatively, the communications manager 720 may support wireless communication at a second base station in accordance with examples as disclosed herein. For example, the communications manager 720 may be configured as or otherwise support a means for receiving, according to a beam configuration on one or more symbols configured for uplink, a first uplink message from one or more user equipments (UEs) served by the second base station. The communications manager 720 may be configured as or otherwise support a means for detecting signals transmitted by a first base station on the one or more symbols configured for uplink. The communications manager 720 may be configured as or otherwise support a means for transmitting a request for the first base station to modify transmissions on the one or more symbols configured for responsive to detecting the signals on the one or more symbols configured for uplink.

By including or configuring the communications manager 720 in accordance with examples as described herein, the device 705 may support techniques for improved communication reliability, reduced latency, more efficient utilization of communication resources, and improved coordination between devices by utilizing inter-base station beam management procedures.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of inter-base station beam management procedure as described herein, or the processor 740 and the memory 730 may be otherwise configured to perform or support such operations.

Figure 8:
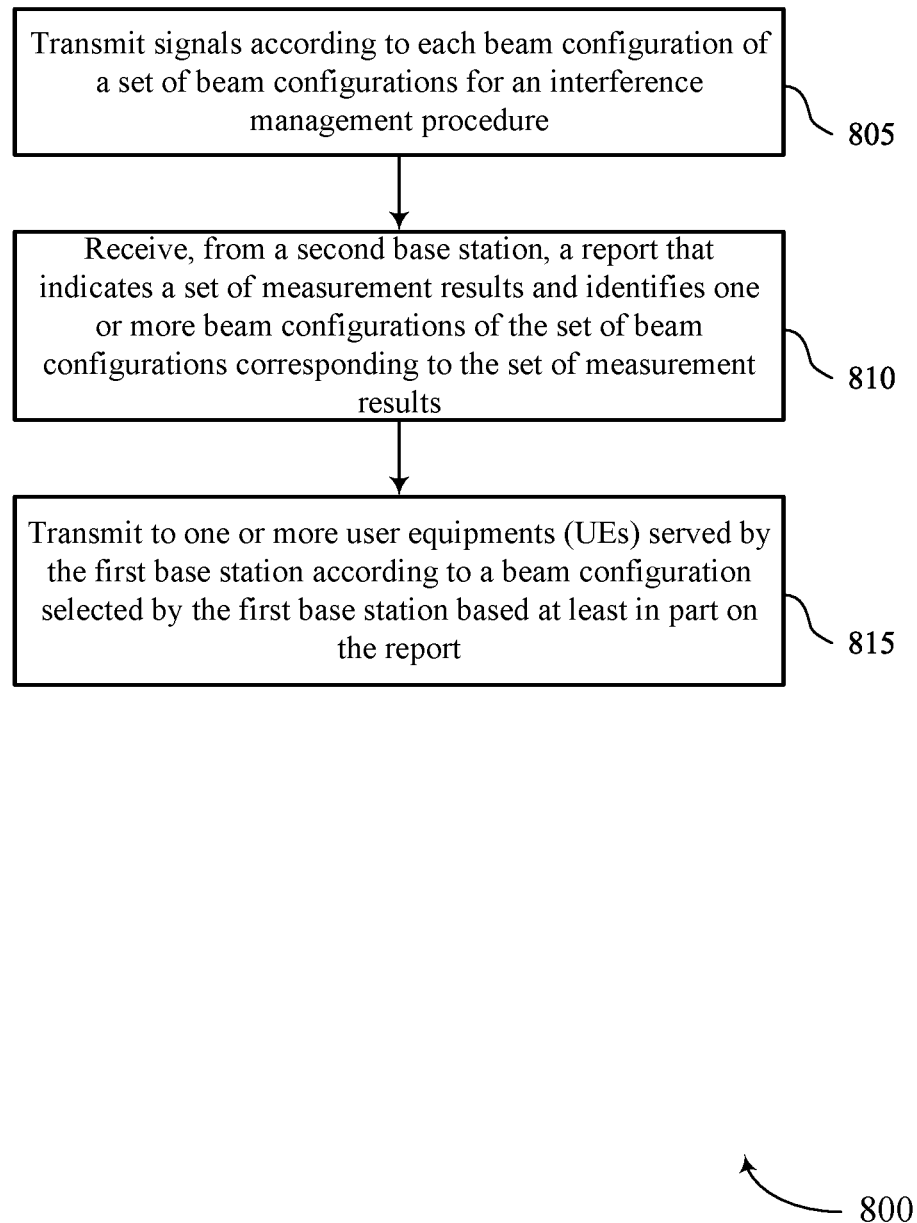
FIGS. 8 through 13 show flowcharts illustrating methods that support inter-base station beam management procedure in accordance with aspects of the present disclosure.

FIG. 8 shows a flowchart illustrating a method 800 that supports inter-base station beam management procedure in accordance with aspects of the present disclosure. The operations of the method 800 may be implemented by a base station or its components as described herein. For example, the operations of the method 800 may be performed by a base station 105 as described with reference to FIGS. 1 through 7. In some examples, a base station may execute a set of instructions to control the functional elements of the base station to perform the described functions. Additionally or alternatively, the base station may perform aspects of the described functions using special-purpose hardware.

At 805, the method may include transmitting signals according to each beam configuration of a set of beam configurations for an interference management procedure. The operations of 805 may be performed in accordance with examples as disclosed herein. In some examples, aspects of the operations of 805 may be performed by a signal transmitter 625 as described with reference to FIG. 6.

At 810, the method may include receiving, from a second base station, a report that indicates a set of measurement results and identifies one or more beam configurations of the set of beam configurations corresponding to the set of measurement results. The operations of 810 may be performed in accordance with examples as disclosed herein. In some examples, aspects of the operations of 810 may be performed by a report receiver 630 as described with reference to FIG. 6.

At 815, the method may include transmitting to one or more user equipments (UEs) served by the first base station according to a beam configuration selected by the first base station based on the report. The operations of 815 may be performed in accordance with examples as disclosed herein. In some examples, aspects of the operations of 815 may be performed by a signal transmitter 625 as described with reference to FIG. 6.

Figure 9:
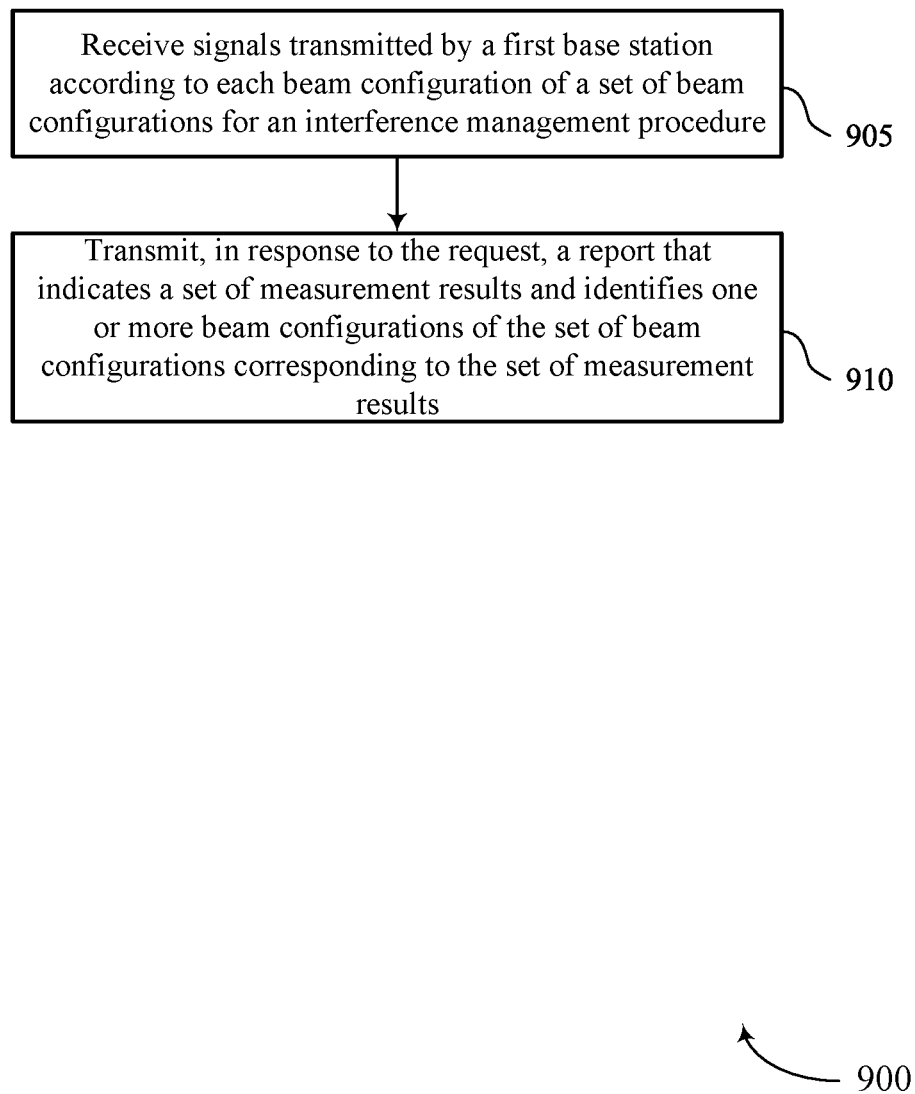

FIG. 9 shows a flowchart illustrating a method 900 that supports inter-base station beam management procedure in accordance with aspects of the present disclosure. The operations of the method 900 may be implemented by a base station or its components as described herein. For example, the operations of the method 900 may be performed by a base station 105 as described with reference to FIGS. 1 through 7. In some examples, a base station may execute a set of instructions to control the functional elements of the base station to perform the described functions. Additionally or alternatively, the base station may perform aspects of the described functions using special-purpose hardware.

At 905, the method may include receiving signals transmitted by a first base station according to each beam configuration of a set of beam configurations for an interference management procedure. The operations of 905 may be performed in accordance with examples as disclosed herein. In some examples, aspects of the operations of 905 may be performed by a signal receiver 635 as described with reference to FIG. 6.

At 910, the method may include transmitting, in response to the received signals, a report that indicates a set of measurement results and identifies one or more beam configurations of the set of beam configurations corresponding to the set of measurement results. The operations of 910 may be performed in accordance with examples as disclosed herein. In some examples, aspects of the operations of 910 may be performed by a report transmitter 640 as described with reference to FIG. 6.

Figure 10:
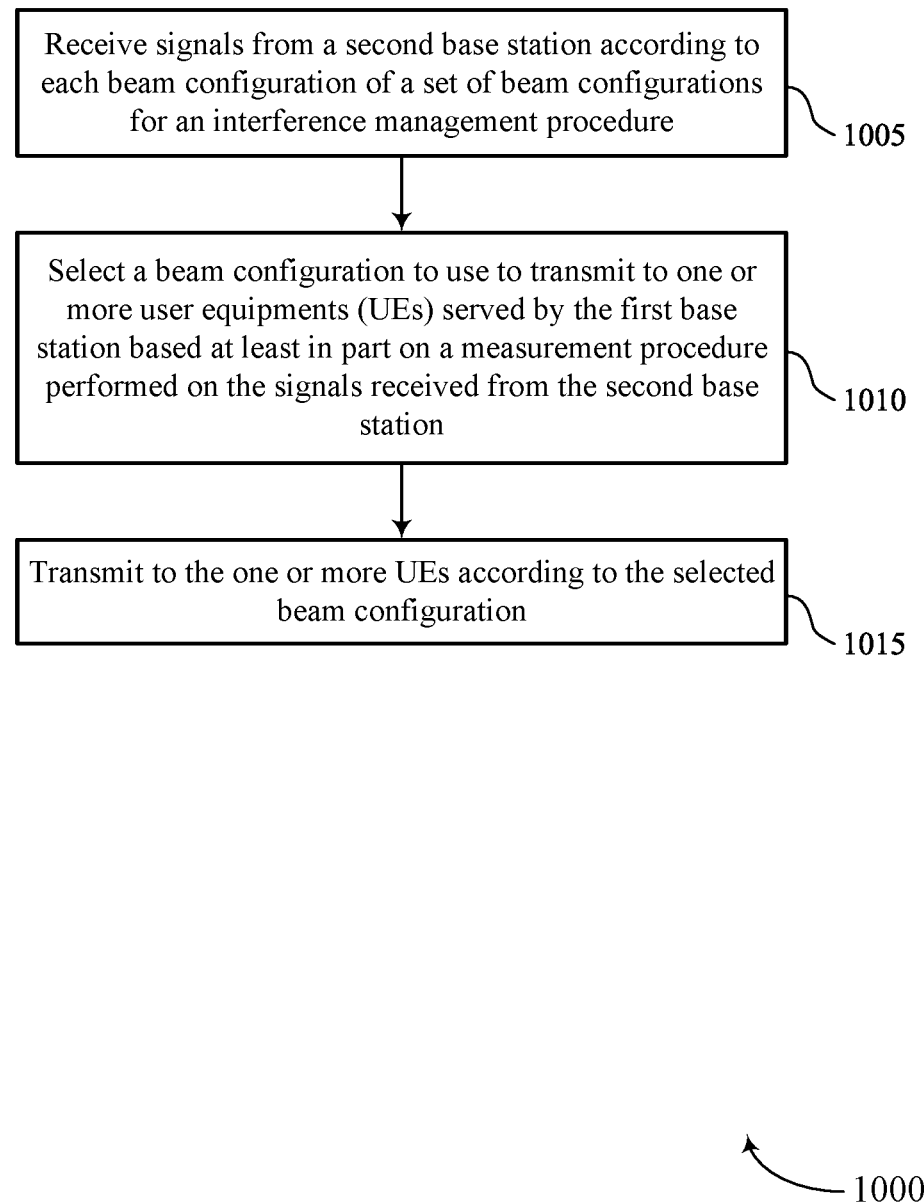

FIG. 10 shows a flowchart illustrating a method 1000 that supports inter-base station beam management procedure in accordance with aspects of the present disclosure. The operations of the method 1000 may be implemented by a base station or its components as described herein. For example, the operations of the method 1000 may be performed by a base station 105 as described with reference to FIGS. 1 through 7. In some examples, a base station may execute a set of instructions to control the functional elements of the base station to perform the described functions. Additionally or alternatively, the base station may perform aspects of the described functions using special-purpose hardware.

At 1005, the method may include receiving signals from a second base station according to each beam configuration of a set of beam configurations for an interference management procedure. The operations of 1005 may be performed in accordance with examples as disclosed herein. In some examples, aspects of the operations of 1005 may be performed by a signal receiver 635 as described with reference to FIG. 6.

At 1010, the method may include selecting a beam configuration to use to transmit to one or more user equipments (UEs) served by the first base station based on a measurement procedure performed on the signals received from the second base station. The operations of 1010 may be performed in accordance with examples as disclosed herein. In some examples, aspects of the operations of 1010 may be performed by a beam configuration selection component 645 as described with reference to FIG. 6.

At 1015, the method may include transmitting to the one or more UEs according to the selected beam configuration. The operations of 1015 may be performed in accordance with examples as disclosed herein. In some examples, aspects of the operations of 1015 may be performed by a signal transmitter 625 as described with reference to FIG. 6.

Figure 11:
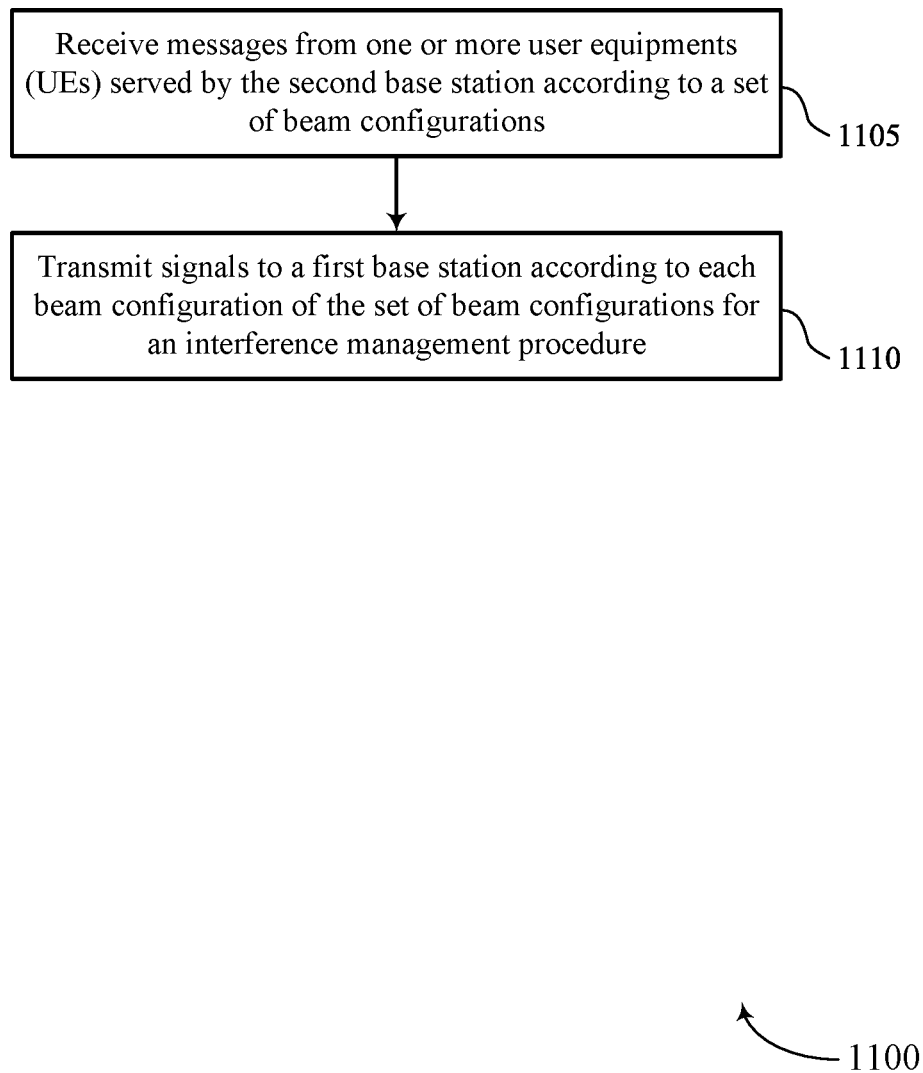

FIG. 11 shows a flowchart illustrating a method 1100 that supports inter-base station beam management procedure in accordance with aspects of the present disclosure. The operations of the method 1100 may be implemented by a base station or its components as described herein. For example, the operations of the method 1100 may be performed by a base station 105 as described with reference to FIGS. 1 through 7. In some examples, a base station may execute a set of instructions to control the functional elements of the base station to perform the described functions. Additionally or alternatively, the base station may perform aspects of the described functions using special-purpose hardware.

At 1105, the method may include receiving messages from one or more UEs served by the second base station according to a set of beam configurations. The operations of 1105 may be performed in accordance with examples as disclosed herein. In some examples, aspects of the operations of 1105 may be performed by a signal receiver 635 as described with reference to FIG. 6.

At 1110, the method may include transmitting signals to a first base station according to each beam configuration of the set of beam configurations for an interference management procedure. The operations of 1110 may be performed in accordance with examples as disclosed herein. In some examples, aspects of the operations of 1110 may be performed by a signal transmitter 625 as described with reference to FIG. 6.

Figure 12:
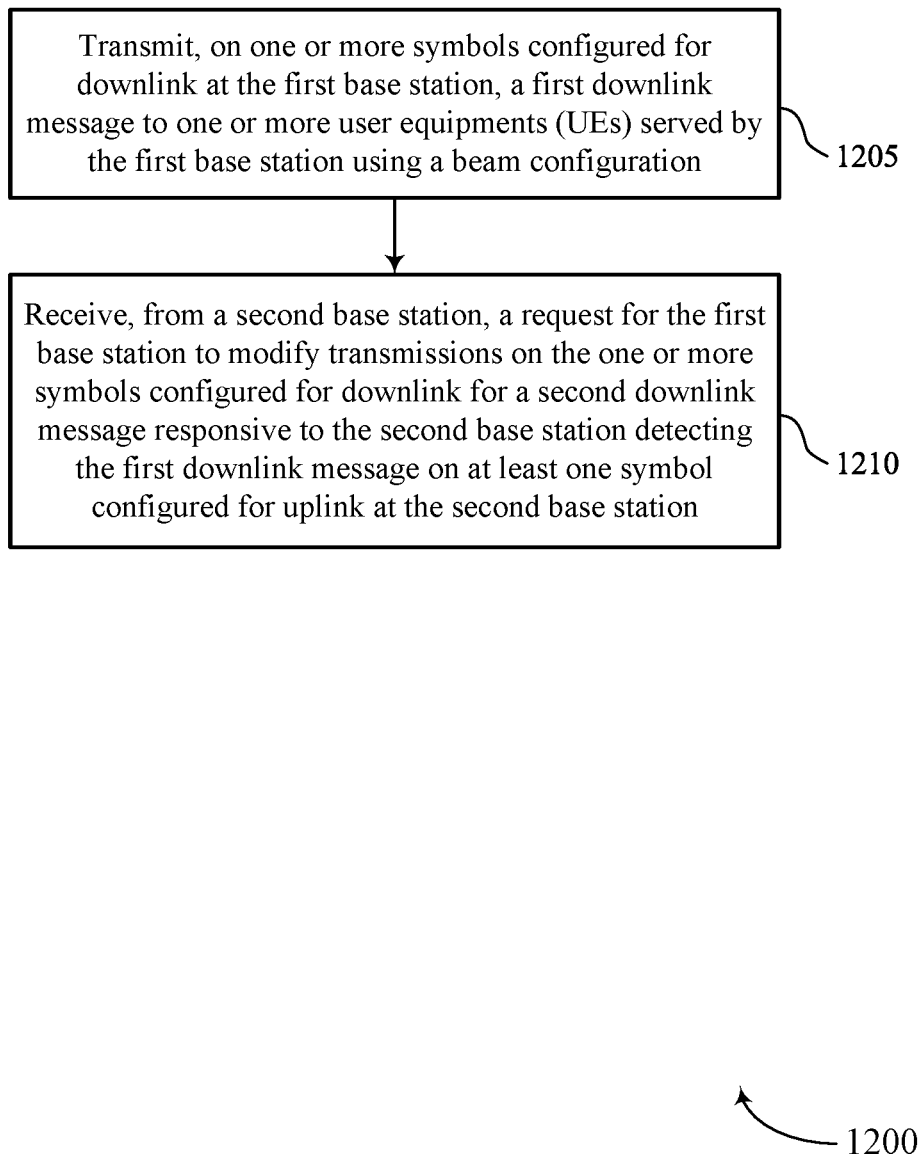

FIG. 12 shows a flowchart illustrating a method 1200 that supports inter-base station beam management procedure in accordance with aspects of the present disclosure. The operations of the method 1200 may be implemented by a base station or its components as described herein. For example, the operations of the method 1200 may be performed by a base station 105 as described with reference to FIGS. 1 through 7. In some examples, a base station may execute a set of instructions to control the functional elements of the base station to perform the described functions. Additionally or alternatively, the base station may perform aspects of the described functions using special-purpose hardware.

At 1205, the method may include transmitting, on one or more symbols configured for downlink at the first base station, a first downlink message to one or more UEs served by the first base station using a beam configuration. The operations of 1205 may be performed in accordance with examples as disclosed herein. In some examples, aspects of the operations of 1205 may be performed by a signal transmitter 625 as described with reference to FIG. 6.

At 1210, the method may include receiving, from a second base station, a request for the first base station to modify transmissions on the one or more symbols configured for downlink for a second downlink message responsive to the second base station detecting the first downlink message on at least one symbol configured for uplink at the second base station. The operations of 1210 may be performed in accordance with examples as disclosed herein. In some examples, aspects of the operations of 1210 may be performed by a request receiver 650 as described with reference to FIG. 6.

Figure 13:
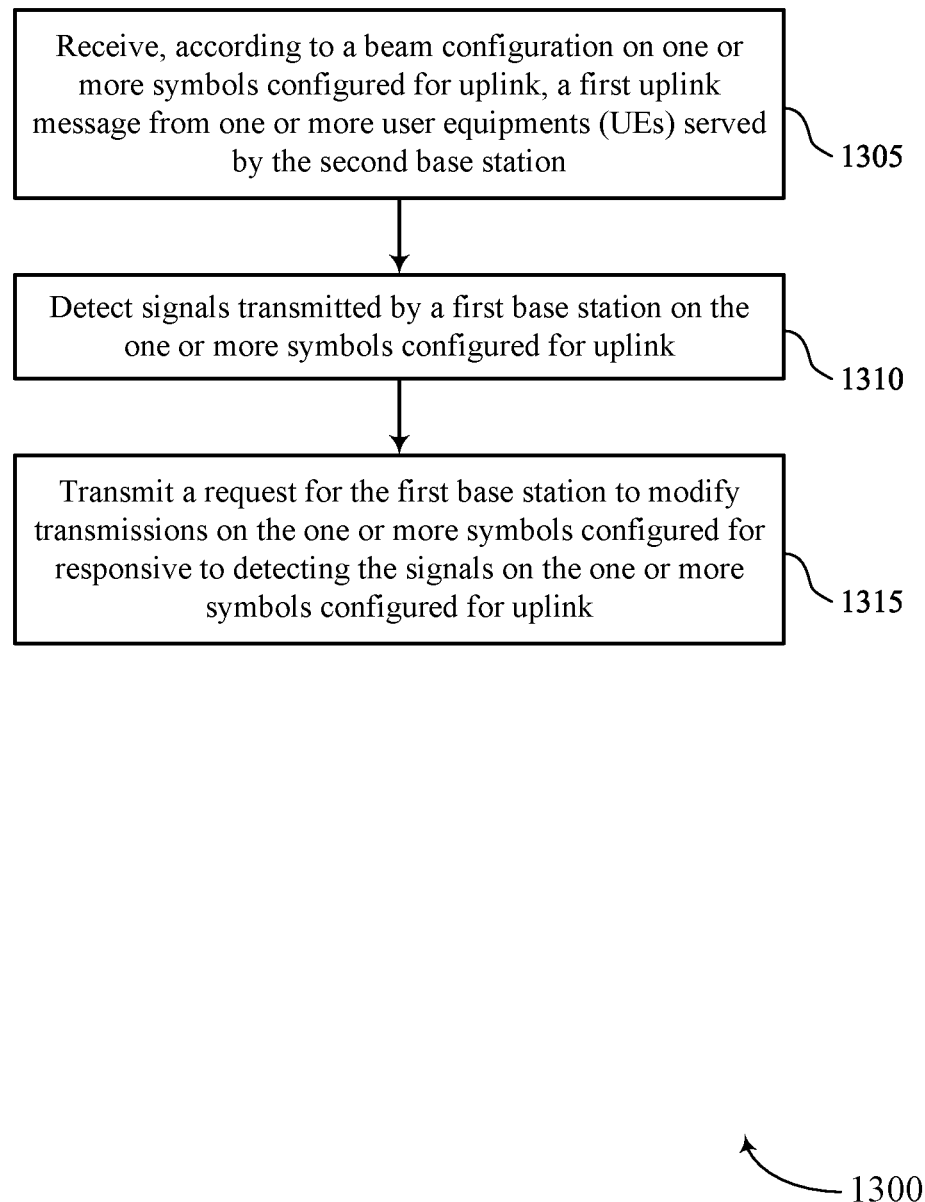

FIG. 13 shows a flowchart illustrating a method 1300 that supports inter-base station beam management procedure in accordance with aspects of the present disclosure. The operations of the method 1300 may be implemented by a base station or its components as described herein. For example, the operations of the method 1300 may be performed by a base station 105 as described with reference to FIGS. 1 through 7. In some examples, a base station may execute a set of instructions to control the functional elements of the base station to perform the described functions. Additionally or alternatively, the base station may perform aspects of the described functions using special-purpose hardware.

At 1305, the method may include receiving, according to a beam configuration on one or more symbols configured for uplink, a first uplink message from one or more UEs served by the second base station. The operations of 1305 may be performed in accordance with examples as disclosed herein. In some examples, aspects of the operations of 1305 may be performed by a signal receiver 635 as described with reference to FIG. 6.

At 1310, the method may include detecting signals transmitted by a first base station on the one or more symbols configured for uplink. The operations of 1310 may be performed in accordance with examples as disclosed herein. In some examples, aspects of the operations of 1310 may be performed by a signal detection component 655 as described with reference to FIG. 6.

At 1315, the method may include transmitting a request for the first base station to modify transmissions on the one or more symbols configured for responsive to detecting the signals on the one or more symbols configured for uplink. The operations of 1315 may be performed in accordance with examples as disclosed herein. In some examples, aspects of the operations of 1315 may be performed by a request transmitter 660 as described with reference to FIG. 6.

The following provides an overview of aspects of the present disclosure:

Aspect 1: A method for wireless communication at a first base station, comprising: transmitting signals according to each beam configuration of a set of beam configurations for an interference management procedure; receiving, from a second base station, a report that indicates a set of measurement results and identifies one or more beam configurations of the set of beam configurations corresponding to the set of measurement results; and transmitting to one or more user equipments (UEs) served by the first base station according to a beam configuration selected by the first base station based at least in part on the report.

Aspect 2: The method of aspect 1, further comprising: transmitting, to the second base station, a request for the second base station to measure the signals transmitted by the first base station according to the set of beam configurations, the report received at least in part in response to the transmitted request.

Aspect 3: The method of any of aspects 1 through 2, wherein transmitting the signals according to each beam configuration of the set of beam configurations comprises:

transmitting one or more synchronization signal blocks or channel state information reference signals using each beam configuration of the set of beam configurations, wherein the one or more beam configurations identified by the report correspond to one or more of the one or more synchronization signal blocks or channel state information reference signals.

Aspect 4: The method of any of aspects 1 through 3, wherein receiving the report comprises: receiving, from the second base station, an indication of a cross base station interference signal strength associated with interference between base stations and associated with at least one beam pair that includes at least one beam configuration of the set of beam configurations and a receive beam of the second base station, a highest signal strength from a set of cross base station interference signal strengths associated with the set of beam configurations and a set of receive beams of the second base station, one or more beam configurations that are allowed by the second base station, one or more beam configurations that are disallowed by the second base station, or any combination thereof.

Aspect 5: The method of any of aspects 1 through 4, further comprising: communicating a measurement configuration that identifies the set of beam configurations and one or more parameters for the set of beam configurations.

Aspect 6: The method of aspect 5, wherein the one or more parameters for the set of beam configurations comprise quasi-co-location information, a repetition quantity, a periodicity, a time location, a frequency location, a cross base station interference threshold, or a combination thereof, for a measurement procedure to be performed.

Aspect 7: The method of any of aspects 5 through 6, wherein communicating the measurement configuration comprises: receiving the measurement configuration from the second base station.

Aspect 8: The method of any of aspects 5 through 7, wherein communicating the measurement configuration comprises: receiving the measurement configuration from a central unit associated with the first base station, the second base station, or both.

Aspect 9: A method for wireless communication at a second base station, comprising: receiving signals transmitted by a first base station according to each beam configuration of a set of beam configurations for an interference management procedure; and transmitting, in response to the received signals, a report that indicates a set of measurement results and identifies one or more beam configurations of the set of beam configurations corresponding to the set of measurement results.

Aspect 10: The method of aspect 9, further comprising: receiving, from the first base station, a request for the second base station to measure signals transmitted by the first base station according to the set of beam configurations.

Aspect 11: The method of any of aspects 9 through 10, wherein receiving the signals according to each beam configuration of the set of beam configurations comprises: receiving one or more synchronization signal blocks or channel state information reference signals using each beam configuration of the set of beam configurations, wherein the one or more beam configurations identified by the report correspond to one or more of the one or more synchronization signal blocks or channel state information reference signals.

Aspect 12: The method of any of aspects 9 through 11, wherein transmitting the report comprises: transmitting an indication of a cross base station interference signal strength associated with at least one beam pair that includes at least one beam configuration of the set of beam configurations and a receive beam of the second base station, a highest signal strength from a set of cross base station interference signal strengths associated with the set of beam configurations and a set of receive beams of the second base station, one or more beam configurations that are allowed by the second base station, one or more beam configurations that are disallowed by the second base station, or any combination thereof.

Aspect 13: The method of any of aspects 9 through 12, further comprising: communicating a measurement configuration that identifies the set of beam configurations and one or more parameters for the set of beam configurations.

Aspect 14: The method of aspect 13, wherein the one or more parameters for the set of beam configurations comprise quasi-co-location information, a repetition quantity, a periodicity, a time location, a frequency location, a cross base station interference threshold, or a combination thereof, for a measurement procedure to be performed.

Aspect 15: The method of any of aspects 13 through 14, wherein communicating the measurement configuration comprises: transmitting the measurement configuration to the first base station.

Aspect 16: The method of any of aspects 13 through 15, wherein communicating the measurement configuration comprises: receiving the measurement configuration from a central unit associated with the first base station, the second base station, or both.

Aspect 17: A method for wireless communication at a first base station, comprising: receiving signals from a second base station according to each beam configuration of a set of beam configurations for an interference management procedure; selecting a beam configuration to use to transmit to one or more user equipments (UEs) served by the first base station based at least in part on a measurement procedure performed on the signals received from the second base station; and transmitting to the one or more UEs according to the selected beam configuration.

Aspect 18: The method of aspect 17, further comprising: transmitting, to the second base station, a request for the second base station to transmit the signals according to the set of beam configurations for the interference management procedure.

Aspect 19: The method of any of aspects 17 or 18, wherein transmitting the request for the second base station comprises: transmitting, to the second base station, the request comprising an indication of one or more parameters for the second base station to use to transmit the signals according to the set of beam configurations.

Aspect 20: The method of any of aspects 17 through 19, wherein receiving the signals from the second base station according to the set of beam configurations comprises: receiving one or more synchronization signal blocks or channel state information reference signals corresponding to the set of beam configurations.

Aspect 21: The method of any of aspects 17 through 20, further comprising: receiving a measurement configuration that identifies the set of beam configurations and one or more parameters for the set of beam configurations.

Aspect 22: The method of aspect 21, wherein the one or more parameters for the set of beam configurations comprise quasi-co-location information, a repetition quantity, a periodicity, a time location, a frequency location, a cross base station interference threshold, or a combination thereof, for the measurement procedure to be performed.

Aspect 23: The method of any of aspects 21 through 22, wherein receiving the measurement configuration comprises: receiving the measurement configuration from the second base station.

Aspect 24: The method of any of aspects 21 through 23, wherein receiving the measurement configuration comprises: receiving the measurement configuration from a central unit associated with the first base station, the second base station, or both.

Aspect 25: A method for wireless communication at a second base station, comprising: receiving messages from one or more user equipments (UEs) served by the second base station according to a set of beam configurations; and transmitting signals to a first base station according to each beam configuration of the set of beam configurations for an interference management procedure.

Aspect 26: The method of aspect 25, further comprising: receiving, from the first base station, a request for the second base station to transmit the signals according to the set of beam configurations for the interference management procedure, the signals transmitted to the first base station at least in part in response to the received request.

Aspect 27: The method of any of aspects 25 through 26, wherein transmitting the signals according to the set of beam configurations comprises: transmitting one or more synchronization signal blocks or channel state information reference signals corresponding to the set of beam configurations.

Aspect 28: The method of any of aspects 25 through 27, wherein receiving the request for the second base station comprises: receiving, from the first base station, the request comprising an indication of one or more parameters for the second base station to use to transmit the signals according to the set of beam configurations.

Aspect 29: The method of aspect 28, wherein the one or more parameters comprise a repetition quantity, a periodicity, a time location, a frequency location, a cross base station interference threshold, or a combination thereof.

Aspect 30: The method of any of aspects 25 through 29, further comprising: transmitting, to the first base station, a measurement configuration that identifies the set of beam configurations and one or more parameters for the set of beam configurations.

Aspect 31: The method of aspect 30, wherein the one or more parameters for the set of beam configurations comprise quasi-co-location information, a repetition quantity, a periodicity, a time location, a frequency location, a cross base station interference threshold, or a combination thereof, for a measurement procedure to be performed.

Aspect 32: A method for wireless communication at a first base station, comprising: transmitting, on one or more symbols configured for downlink at the first base station, a first downlink message to one or more user equipments (UEs) served by the first base station using a beam configuration; and receiving, from a second base station, a request for the first base station to modify transmissions on the one or more symbols configured for downlink for a second downlink message responsive to the second base station detecting the first downlink message on at least one symbol configured for uplink at the second base station.

Aspect 33: The method of aspect 32, wherein the request comprises an indication for the first base station to refrain from transmitting on the one or more symbols for the second downlink message.

Aspect 34: The method of any of aspects 32 through 33, wherein the request comprises an indication for the first base station to backoff a first transmit power for at least the one or more symbols, the method further comprising: transmitting, responsive to receiving the request, the second downlink message to the one or more UEs on at least one symbol according to a second transmit power less than a first transmit power for the first downlink message.

Aspect 35: The method of any of aspects 32 through 34, wherein the request comprises an indication of a second beam configuration for the first base station to use to transmit on the one or more symbols, the method further comprising: transmitting, responsive to receiving the request, the second downlink message according to the second beam configuration.

Aspect 36: The method of aspect 35, wherein the first base station transmits according to the second beam configuration for a quantity of slots indicated by the request.

Aspect 37: A method for wireless communication at a second base station, comprising: receiving, according to a beam configuration on one or more symbols configured for uplink, a first uplink message from one or more user equipments (UEs) served by the second base station; detecting signals transmitted by a first base station on the one or more symbols configured for uplink; and transmitting a request for the first base station to modify transmissions on the one or more symbols configured for responsive to detecting the signals on the one or more symbols configured for uplink.

Aspect 38: The method of aspect 37, wherein the request comprises an indication for the first base station to refrain from transmitting on the one or more symbols.

Aspect 39: The method of any of aspects 37 through 38, wherein the request comprises an indication for the first base station to backoff a first transmit power for at least the one or more symbols.

Aspect 40: The method of any of aspects 37 through 39, wherein the request comprises an indication of a second beam configuration for the first base station to use to transmit on the one or more symbols.

Aspect 41: An apparatus for wireless communication at a first base station, comprising a processor; memory coupled with the processor; and instructions stored in the memory and executable by the processor to cause the apparatus to perform a method of any of aspects 1 through 8.

Aspect 42: An apparatus for wireless communication at a first base station, comprising at least one means for performing a method of any of aspects 1 through 8.

Aspect 43: A non-transitory computer-readable medium storing code for wireless communication at a first base station, the code comprising instructions executable by a processor to perform a method of any of aspects 1 through 8.

Aspect 44: An apparatus for wireless communication at a second base station, comprising a processor; memory coupled with the processor; and instructions stored in the memory and executable by the processor to cause the apparatus to perform a method of any of aspects 9 through 16.

Aspect 45: An apparatus for wireless communication at a second base station, comprising at least one means for performing a method of any of aspects 9 through 16.

Aspect 46: A non-transitory computer-readable medium storing code for wireless communication at a second base station, the code comprising instructions executable by a processor to perform a method of any of aspects 9 through 16.

Aspect 47: An apparatus for wireless communication at a first base station, comprising a processor; memory coupled with the processor; and instructions stored in the memory and executable by the processor to cause the apparatus to perform a method of any of aspects 17 through 24.

Aspect 48: An apparatus for wireless communication at a first base station, comprising at least one means for performing a method of any of aspects 17 through 24.

Aspect 49: A non-transitory computer-readable medium storing code for wireless communication at a first base station, the code comprising instructions executable by a processor to perform a method of any of aspects 17 through 24.

Aspect 50: An apparatus for wireless communication at a second base station, comprising a processor; memory coupled with the processor; and instructions stored in the memory and executable by the processor to cause the apparatus to perform a method of any of aspects 25 through 31.

Aspect 51: An apparatus for wireless communication at a second base station, comprising at least one means for performing a method of any of aspects 25 through 31.

Aspect 52: A non-transitory computer-readable medium storing code for wireless communication at a second base station, the code comprising instructions executable by a processor to perform a method of any of aspects 25 through 31.

Aspect 53: An apparatus for wireless communication at a first base station, comprising a processor; memory coupled with the processor; and instructions stored in the memory and executable by the processor to cause the apparatus to perform a method of any of aspects 32 through 36.

Aspect 54: An apparatus for wireless communication at a first base station, comprising at least one means for performing a method of any of aspects 32 through 36.

Aspect 55: A non-transitory computer-readable medium storing code for wireless communication at a first base station, the code comprising instructions executable by a processor to perform a method of any of aspects 32 through 36.

Aspect 56: An apparatus for wireless communication at a second base station, comprising a processor; memory coupled with the processor; and instructions stored in the memory and executable by the processor to cause the apparatus to perform a method of any of aspects 37 through 40.

Aspect 57: An apparatus for wireless communication at a second base station, comprising at least one means for performing a method of any of aspects 37 through 40.

Aspect 58: A non-transitory computer-readable medium storing code for wireless communication at a second base station, the code comprising instructions executable by a processor to perform a method of any of aspects 37 through 40.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first base station, comprising:
   a processor;
   memory coupled with the processor; and
   instructions stored in the memory and executable by the processor to cause the apparatus to:
      transmit a measurement configuration that pertains to an interference management procedure, wherein the measurement configuration identifies a set of beam configurations and quasi-co-location information for each beam configuration;
      transmit signals according to each beam configuration of the set of beam configurations;
      receive, from a second base station, a report that indicates a set of measurement results and identifies one or more beam configurations of the set of beam configurations corresponding to the set of measurement results; and
      transmit to one or more user equipments (UEs) served by the first base station according to a beam configuration selected by the first base station based at least in part on the report.

2. The apparatus of claim 1, wherein the instructions are further executable by the processor to cause the apparatus to:
   transmit, to the second base station, a request for the second base station to measure the signals transmitted by the first base station according to the set of beam configurations, the report received at least in part in response to the transmitted request.

3. The apparatus of claim 1, wherein the instructions to transmit the signals according to each beam configuration of the set of beam configurations are executable by the processor to cause the apparatus to:
   transmit one or more synchronization signal blocks or channel state information reference signals using each beam configuration of the set of beam configurations, wherein the one or more beam configurations identified by the report correspond to one or more of the one or more synchronization signal blocks or channel state information reference signals.

4. The apparatus of claim 1, wherein the instructions to receive the report are executable by the processor to cause the apparatus to:
   receive, from the second base station, an indication of a cross base station interference signal strength associated with interference between base stations and associated with at least one beam pair that includes at least one beam configuration of the set of beam configurations and a receive beam of the second base station, a highest signal strength from a set of cross base station interference signal strengths associated with the set of beam configurations and a set of receive beams of the second base station, one or more beam configurations that are allowed by the second base station, one or more beam configurations that are disallowed by the second base station, or any combination thereof.

5. The apparatus of claim 1, wherein the measurement configuration further identifies a repetition quantity, a periodicity, a time location, a frequency location, a cross base station interference threshold, or a combination thereof, for each beam configuration.

6. The apparatus of claim 1, wherein the instructions are further executable by the processor to cause the apparatus to:
   receive the measurement configuration from the second base station.

7. The apparatus of claim 1, wherein the instructions are further executable by the processor to cause the apparatus to:
   receive the measurement configuration from a central unit associated with the first base station, the second base station, or both.

8. An apparatus for wireless communication at a second base station, comprising:
   a processor;
   memory coupled with the processor; and instructions stored in the memory and executable by the processor to cause the apparatus to:

receive a measurement configuration that pertains to an interference management procedure, wherein the measurement configuration identifies a set of beam configurations and quasi-co-location information for each beam configuration;

receive signals transmitted by a first base station according to each beam configuration of the set of beam configurations; and transmit, in response to the received signals, a report that indicates a set of measurement results and identifies one or more beam configurations of the set of beam configurations corresponding to the set of measurement results.

9. The apparatus of claim 8, wherein the instructions are further executable by the processor to cause the apparatus to:

receive, from the first base station, a request for the second base station to measure signals transmitted by the first base station according to the set of beam configurations.

10. The apparatus of claim 8, wherein the instructions to receive the signals according to each beam configuration of the set of beam configurations are executable by the processor to cause the apparatus to:

receive one or more synchronization signal blocks or channel state information reference signals using each beam configuration of the set of beam configurations, wherein the one or more beam configurations identified by the report correspond to one or more of the one or more synchronization signal blocks or channel state information reference signals.

11. The apparatus of claim 8, wherein the instructions to transmit the report are executable by the processor to cause the apparatus to:

transmit an indication of a cross base station interference signal strength associated with at least one beam pair that includes at least one beam configuration of the set of beam configurations and a receive beam of the second base station, a highest signal strength from a set of cross base station interference signal strengths associated with the set of beam configurations and a set of receive beams of the second base station, one or more beam configurations that are allowed by the second base station, one or more beam configurations that are disallowed by the second base station, or any combination thereof.

12. The apparatus of claim 8, wherein the measurement configuration further identifies a repetition quantity, a periodicity, a time location, a frequency location, a cross base station interference threshold, or a combination thereof, for each beam configuration.

13. The apparatus of claim 8, wherein the instructions are further executable by the processor to cause the apparatus to:

transmit the measurement configuration to the first base station.

14. The apparatus of claim 8, wherein the instructions are further executable by the processor to cause the apparatus to:

receive the measurement configuration from a central unit associated with the first base station, the second base station, or both.

15. A method for wireless communication at a first base station, comprising:

transmitting a measurement configuration that pertains to an interference management procedure, wherein the measurement configuration identifies a set of beam configurations and quasi-co-location information for each beam configuration;

transmitting signals according to each beam configuration of the set of beam configurations;

receiving, from a second base station, a report that indicates a set of measurement results and identifies one or more beam configurations of the set of beam configurations corresponding to the set of measurement results; and transmitting to one or more user equipments (UEs) served by the first base station according to a beam configuration selected by the first base station based at least in part on the report.

16. The method of claim 15, further comprising:

transmitting, to the second base station, a request for the second base station to measure the signals transmitted by the first base station according to the set of beam configurations, the report received at least in part in response to the transmitted request.

17. The method of claim 15, wherein transmitting the signals according to each beam configuration of the set of beam configurations comprises:

transmitting one or more synchronization signal blocks or channel state information reference signals using each beam configuration of the set of beam configurations, wherein the one or more beam configurations identified by the report correspond to one or more of the one or more synchronization signal blocks or channel state information reference signals.

18. The method of claim 15, wherein receiving the report comprises:

receiving, from the second base station, an indication of a cross base station interference signal strength associated with interference between base stations and associated with at least one beam pair that includes at least one beam configuration of the set of beam configurations and a receive beam of the second base station, a highest signal strength from a set of cross base station interference signal strengths associated with the set of beam configurations and a set of receive beams of the second base station, one or more beam configurations that are allowed by the second base station, one or more beam configurations that are disallowed by the second base station, or any combination thereof.

19. The method of claim 15, wherein the measurement configuration further identifies a repetition quantity, a periodicity, a time location, a frequency location, a cross base station interference threshold, or a combination thereof, for each beam configuration.

20. The method of claim 15, further comprising:

receiving the measurement configuration from the second base station.

21. The method of claim 15, further comprising:

receiving the measurement configuration from a central unit associated with the first base station, the second base station, or both.

22. A method for wireless communication at a second base station, comprising:

receiving a measurement configuration that pertains to an interference management procedure, wherein the measurement configuration identifies a set of beam configurations and quasi-co-location information for each beam configuration;

receiving signals transmitted by a first base station according to each beam configuration of the set of beam configurations; and transmitting, in response to the received signals, a report that indicates a set of measurement results and identifies one or more beam configurations of the set of beam configurations corresponding to the set of measurement results.

23. The method of claim 22, further comprising:

receiving, from the first base station, a request for the second base station to measure signals transmitted by the first base station according to the set of beam configurations.

24. The method of claim 22, wherein receiving the signals according to each beam configuration of the set of beam configurations comprises:

receiving one or more synchronization signal blocks or channel state information reference signals using each beam configuration of the set of beam configurations, wherein the one or more beam configurations identified by the report correspond to one or more of the one or more synchronization signal blocks or channel state information reference signals.

25. The method of claim 22, wherein transmitting the report comprises:

transmitting an indication of a cross base station interference signal strength associated with at least one beam pair that includes at least one beam configuration of the set of beam configurations and a receive beam of the second base station, a highest signal strength from a set of cross base station interference signal strengths associated with the set of beam configurations and a set of receive beams of the second base station, one or more beam configurations that are allowed by the second base station, one or more beam configurations that are disallowed by the second base station, or any combination thereof.

26. The method of claim 22, wherein the measurement configuration further identifies a repetition quantity, a periodicity, a time location, a frequency location, a cross base station interference threshold, or a combination thereof, for each beam configuration.

* * * * *